United States Patent
Hassibi et al.

(10) Patent No.: US 11,047,982 B2
(45) Date of Patent: Jun. 29, 2021

(54) DISTRIBUTED APERTURE OPTICAL RANGING SYSTEM

(71) Applicant: Neural Propulsion Systems, Inc., San Ramon, CA (US)

(72) Inventors: Babak Hassibi, San Marino, CA (US); Behrooz Rezvani, San Ramon, CA (US)

(73) Assignee: Neural Propulsion Systems, Inc., Pleasanton, CA (US)

( * ) Notice: Subject to any disclaimer, the term of this patent is extended or adjusted under 35 U.S.C. 154(b) by 0 days.

(21) Appl. No.: 16/988,701

(22) Filed: Aug. 9, 2020

(65) Prior Publication Data

US 2021/0041562 A1 Feb. 11, 2021

Related U.S. Application Data

(60) Provisional application No. 62/884,651, filed on Aug. 8, 2019.

(51) Int. Cl.
| | | |
|---|---|---|
| *G01C 3/08* | (2006.01) | |
| *G01S 17/36* | (2006.01) | |
| *G01S 17/18* | (2020.01) | |
| *G01S 7/481* | (2006.01) | |
| *G01S 7/4915* | (2020.01) | |
| *G01S 7/484* | (2006.01) | |

(52) U.S. Cl.
CPC ............. *G01S 17/36* (2013.01); *G01S 7/4817* (2013.01); *G01S 7/4915* (2013.01); *G01S 17/18* (2020.01); *G01S 7/484* (2013.01)

(58) Field of Classification Search
CPC ........ G01S 5/16; G01S 7/4865; G01S 17/003; G01S 17/48; G01S 17/42; G01S 17/06

USPC ......................................................... 356/5.01
See application file for complete search history.

(56) References Cited

U.S. PATENT DOCUMENTS

| | | | |
|---|---|---|---|
| 6,621,561 B2 | 9/2003 | Holton | |
| 7,679,751 B1 | 3/2010 | Kablotsky | |
| 8,368,876 B1 | 2/2013 | Johnson et al. | |
| 8,775,081 B2 | 7/2014 | Welty | |
| 9,791,569 B2* | 10/2017 | Hughes | ............. G01S 17/46 |
| 9,823,118 B2 | 11/2017 | Doylend et al. | |
| 10,429,495 B1 | 10/2019 | Wang et al. | |
| 10,429,496 B2 | 10/2019 | Weinberg | |
| 10,466,342 B1 | 11/2019 | Zhu et al. | |
| 10,627,517 B2 | 4/2020 | Yaacobi et al. | |
| 2003/0222778 A1* | 12/2003 | Piesinger | ............. G01S 13/878 340/541 |

(Continued)

OTHER PUBLICATIONS

D. Divsalar et al., "Optical CDMA for a constellation of CubeSats," 2018 IEEE Aerospace Conference (pp. 1-11), Mar. 2018.

(Continued)

*Primary Examiner* — Mark Hellner
(74) *Attorney, Agent, or Firm* — Jacobsen IP Law; Krista S. Jacobsen

(57) ABSTRACT

Disclosed herein are multiple-input, multiple-output (MIMO) LiDAR systems in which the fields of view of multiple illuminators (e.g., lasers) overlap and/or fields of view of multiple detectors (e.g., photodiodes) overlap. Some embodiments provide for illuminators that transmit pulse sequences that are substantially white and substantially uncorrelated so that they can be distinguished from one another when detected by a single detector.

23 Claims, 16 Drawing Sheets

(56) References Cited

U.S. PATENT DOCUMENTS

| | | | |
|---|---|---|---|
| 2018/0074177 A1* | 3/2018 | Rudoy | G01S 13/46 |
| 2019/0129008 A1 | 5/2019 | Lin et al. | |
| 2019/0235043 A1* | 8/2019 | Karlov | G01S 3/785 |
| 2020/0012166 A1 | 1/2020 | Dumais | |
| 2020/0041614 A1* | 2/2020 | Donovan | G01S 17/87 |
| 2020/0088844 A1* | 3/2020 | Gao | G01S 7/487 |

OTHER PUBLICATIONS

International Search Report and Written Opinion of the International Searching Authority from PCT Application No. PCT/US2020/045556 (filed Aug. 9, 2020), dated Jan. 21, 2021.

Reinhard Heckel, "Super-resolution MIMO radar," 2016 IEEE International Symposium on Information Theory, pp. 1416-1420, Jul. 2016.

Zhihui Zhu et al., "Super-Resolution in SAR Imaging: Analysis With the Atomic Norm," 2016 IEEE Sensor Array and Multichannel Signal Processing Workshop (SAM), Jul. 2016.

\* cited by examiner

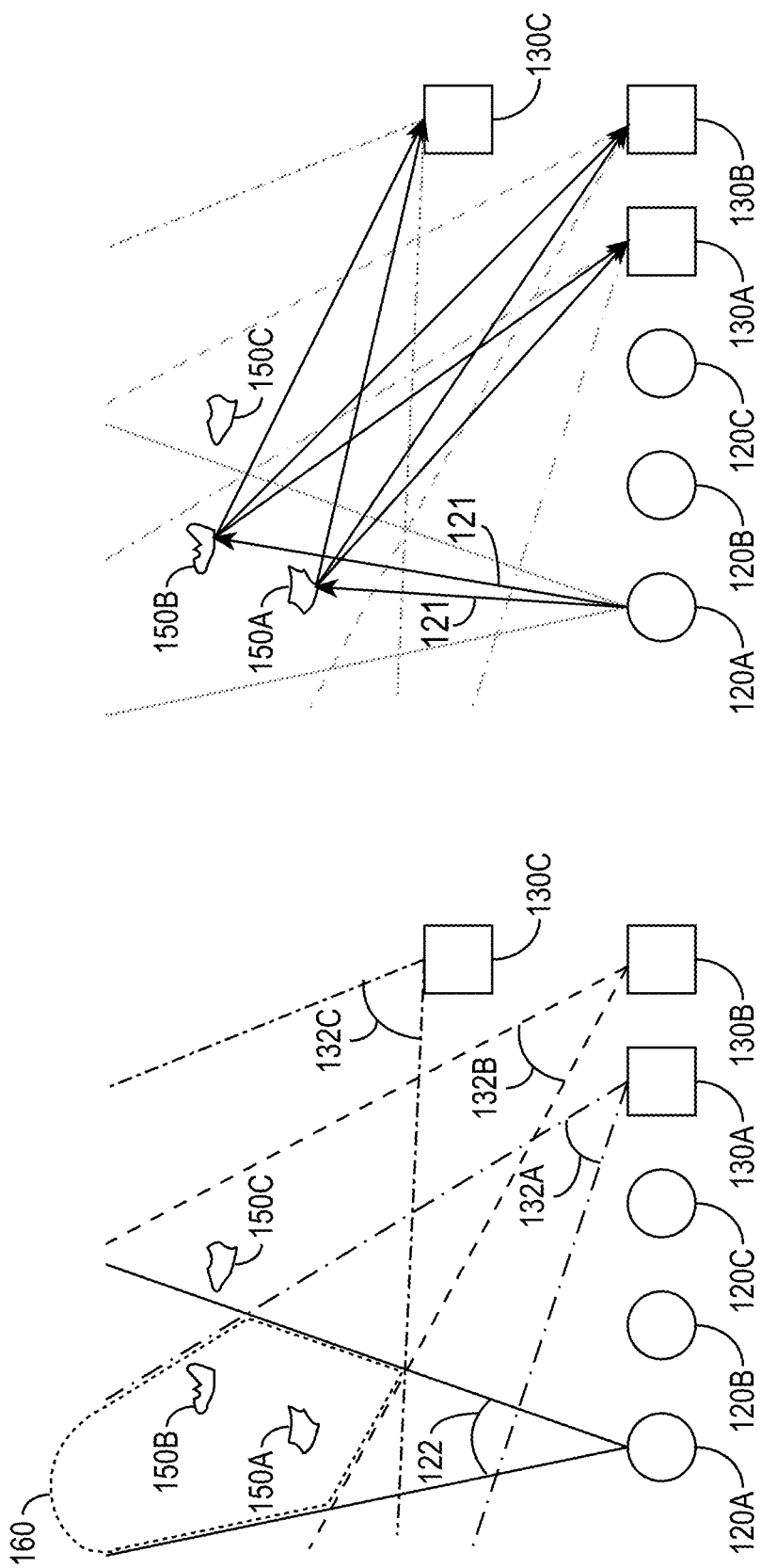

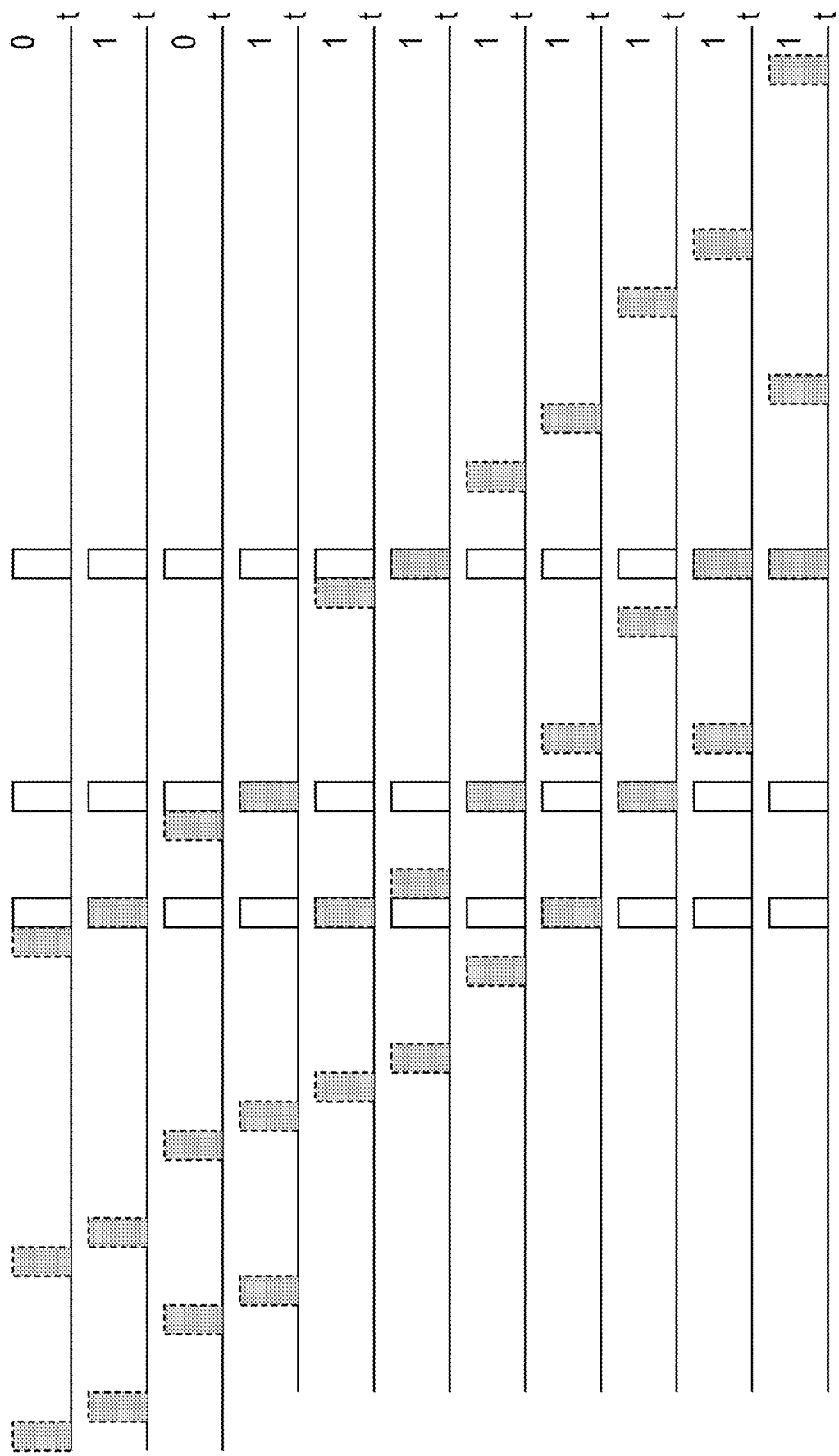

DISTRIBUTED APERTURE OPTICAL RANGING SYSTEM

CROSS-REFERENCE TO RELATED APPLICATIONS

This application claims the benefit of, and hereby incorporates by reference for all purposes, U.S. Provisional Application 62/884,651, filed Aug. 8, 2019 and entitled "DISTRIBUTED APERTURE OPTICAL RANGING SYSTEM."

BACKGROUND

There is an ongoing demand for three-dimensional (3D) object tracking and object scanning for various applications, one of which is autonomous driving. The wavelengths of some types of signals, such as radar, are too long to provide the sub-millimeter resolution needed to detect smaller objects. Light detection and ranging (LiDAR) systems use optical wavelengths that can provide finer resolution than other types of systems, thereby providing good range, accuracy, and resolution. In general, LiDAR systems illuminate a target area or scene with pulsed laser light and measure how long it takes for reflected pulses to be returned to a receiver.

One aspect common to certain conventional LiDAR systems is that the beams of light emitted by different lasers are very narrow and are emitted in specific, known directions so that pulses emitted by different lasers at or around the same time do not interfere with each other. Each laser has a detector situated in close proximity to detect reflections of the pulses emitted by the laser. Because the detector is presumed only to sense reflections of pulses emitted by the laser, the locations of targets that reflect the emitted can be determined unambiguously. The time between when the laser emitted a light pulse and the detector detected a reflection provides the round-trip time to the target, and the direction in which the emitter and detector are oriented allows the exact position of the target to be determined. If no reflection is detected, it is assumed there is no target.

In order to reduce the number of lasers and detectors required to provide sufficient scanning of a scene, some LiDAR systems use a relatively small number of lasers and detectors along with some method of mechanically scanning the environment. For example, a LiDAR system may include transmit and receive optics located on a spinning motor in order to provide a 360-degree horizontal field-of-view. By rotating in small increments (e.g., 0.1 degrees), these systems can provide high resolution. But LiDAR systems that rely on mechanical scanning are subject to constraints on the receiver and transmitter optics. These constraints can limit the overall size and dimensions of the LiDAR system and the sizes and locations of individual components, as well as the measurement range and signal-to-noise ratio (SNR). Moreover, the moving components are subject to failure and may be undesirable for some applications (e.g., autonomous driving).

Another type of LiDAR system is a flash LiDAR system. Flash LiDAR systems direct pulsed beams of light toward a target object within a field-of-view, and an array of light detectors receives light reflected from the target object. For each pulsed beam of light directed toward the target object, the light detector array can receive reflected light corresponding to a frame of data. By using one or more frames of data, the range or distance to the target object can be obtained by determining the elapsed time between transmission of the pulsed beam of light by the illumination source and reception of the reflected light at the light detector array. Although flash LiDAR systems avoid moving components, in order to unambiguously detect the angles of reflections, the light detector uses a large number of optical detectors, each corresponding to a certain direction (e.g., elevation and azimuth) to scan a large scene. For some applications, such as autonomous driving, the cost, size, and/or power consumption of such a system may be prohibitive.

Thus, there is a need for systems that address the drawbacks of conventional LiDAR systems.

SUMMARY

This summary represents non-limiting embodiments of the disclosure.

Disclosed herein are novel LiDAR systems that use fewer optical components (illuminators and detectors) than conventional LiDAR systems but provide higher resolution. As compared to conventional LiDAR systems, both the illuminators (e.g., lasers) and detectors (e.g., photodiodes) have wider and overlapping fields of view, thus resulting in the potential for a single illuminator to illuminate multiple targets within its field of view and for a single detector to detect reflections (which may have resulted from emissions from different illuminators) from multiple targets within its field of view. To allow the positions (also referred to as coordinates) of multiple targets within a volume of space to be resolved, the disclosed LiDAR systems use a plurality of illuminators and/or detectors, situated so that they are non-collinear (meaning that they are not all situated on a single straight line). To allow the LiDAR system to distinguish between reflections of different illuminators' emitted optical signals, illuminators that emit signals within a volume of space at the same time use pulse sequences having specific properties (e.g., they are substantially white and have low cross-correlation with the pulse sequences used by other illuminators emitting in the same field of view at the same time). Because they resolve targets using multiple reflections of optical signals, potentially originating from multiple illuminators, the novel LiDAR systems are referred to herein as multiple-input, multiple-output (MIMO) LiDAR systems.

In some embodiments, a LiDAR system, comprises an array of optical components, the array comprising a plurality of illuminators and a plurality of detectors, each of the plurality of illuminators having a respective illuminator field of view (FOV), and each of the plurality of detectors having a respective detector FOV, and at least one processor coupled to the array of optical components and configured to execute at least one machine-executable instruction. When executed, the at least one machine-executable instruction causes the at least one processor to determine a first distance set, a second distance set, and a third distance set, and, based at least in part on the first, second, and third distance sets, estimate a respective position, in three-dimensional space, of each target of the plurality of targets. In some embodiments, the first distance set corresponds to a first unique illuminator-detector pair in the array of optical components, and the first distance set includes, for each target of a plurality of targets in a volume of space, a respective estimated distance traversed by an optical signal emitted by an illuminator of the first unique illuminator-detector pair, reflected by the target, and detected by a detector of the first unique illuminator-detector pair. In some embodiments, the second distance set corresponds to a second unique illuminator-detector pair in the array of optical components, and the second distance set includes, for each target of the plurality of targets in the volume of space, a respective estimated distance traversed by an optical signal emitted by an illuminator of the second unique illuminator-detector pair, reflected by the target, and detected by a detector of the second unique illuminator-detector pair. In some embodiments, the third distance set corresponds to a third unique illuminator-detector pair in the array of optical components, and the third distance set includes, for each target of the plurality of targets in the volume of space, a respective estimated distance traversed by an optical signal emitted by an illuminator of the third unique illuminator-detector pair, reflected by the target, and detected by a detector of the third unique illuminator-detector pair. In some embodiments, at least two of the illuminator of the first unique illuminator-detector pair, the detector of the first unique illuminator-detector pair, the illuminator of the second unique illuminator-detector pair, the detector of the second unique illuminator-detector pair, the illuminator of the third unique illuminator-detector pair, or the detector of the third unique illuminator-detector pair are non-collinear. In some embodiments, the volume of space is within each of (a) a FOV of the illuminator of the first unique illuminator-detector pair, (b) a FOV of the detector of the first unique illuminator-detector pair, (c) a FOV of the illuminator of the second unique illuminator-detector pair, (d) a FOV of the detector of the second unique illuminator-detector pair, (e) a FOV of the illuminator of the third unique illuminator-detector pair, and (f) a FOV of the detector of the third unique illuminator-detector pair.

In some embodiments, the at least one machine-executable instruction causes the at least one processor to estimate the respective position of each of the plurality of targets by solving at least one quadratic equation.

In some embodiments, the at least one machine-executable instruction causes the at least one processor to determine the first distance set in part by denoising the optical signal detected by the detector of the first unique illuminator-detector pair, performing a correlation of the denoised detected optical signal and the optical signal emitted by the illuminator of the first unique illuminator-detector pair, and identifying at least one peak in a result of the correlation. In some embodiments, denoising the optical signal detected by the detector of the first unique illuminator-detector pair comprises determining or minimizing an atomic norm.

In some embodiments, the at least one machine-executable instruction causes the at least one processor to determine the first distance set in part by performing a correlation, and identifying at least one peak in a result of the correlation.

In some embodiments, the optical signal emitted by the illuminator of the first unique illuminator-detector pair comprises a first pulse sequence transmitted during a time window. In some embodiments in which the optical signal emitted by the illuminator of the first unique illuminator-detector pair comprises a first pulse sequence transmitted during a time window, the first pulse sequence is sparse. In some embodiments, the first pulse sequence is substantially white.

In some embodiments in which the optical signal emitted by the illuminator of the first unique illuminator-detector pair comprises a first pulse sequence transmitted during a time window, the optical signal emitted by the illuminator of the second unique illuminator-detector pair comprises a second pulse sequence transmitted during the time window, wherein the second pulse sequence is different from the first pulse sequence. In some embodiments, the first pulse sequence and the second pulse sequence are substantially uncorrelated. In some embodiments, the first and second pulse sequences are sparse. In some embodiments, each of the first and second pulse sequences is substantially white. In some embodiments, a maximum value of a cross-correlation of the first pulse sequence and the second pulse sequence is less than a threshold (e.g., a maximum number of overlapping pulses).

In some embodiments in which the optical signal emitted by the illuminator of the first unique illuminator-detector pair comprises a first pulse sequence transmitted during a time window, and the optical signal emitted by the illuminator of the second unique illuminator-detector pair comprises a second pulse sequence transmitted during the time window, the optical signal emitted by the illuminator of the third unique illuminator-detector pair comprises a third pulse sequence transmitted during the time window, wherein the third pulse sequence is different from the first pulse sequence and different from the second pulse sequence. In some such embodiments, the first pulse sequence and the second pulse sequence are substantially uncorrelated, the first pulse sequence and the third pulse sequence are substantially uncorrelated, and the second pulse sequence and the third pulse sequence are substantially uncorrelated. In some embodiments, the first, second, and third pulse sequences are sparse. In some embodiments, each of the first, second, and third pulse sequences is substantially white.

In some embodiments, at least two of the illuminator of the first unique illuminator-detector pair, the illuminator of the second unique illuminator-detector pair, or the illuminator of the third unique illuminator-detector pair are a same illuminator.

In some embodiments, at least two of the detector of the first unique illuminator-detector pair, the detector of the second unique illuminator-detector pair, or the detector of the third unique illuminator-detector pair are a same detector.

In some embodiments, at least two of the illuminator of the first unique illuminator-detector pair, the illuminator of the second unique illuminator-detector pair, or the illuminator of the third unique illuminator-detector pair are a same illuminator, and at least two of the detector of the first unique illuminator-detector pair, the detector of the second unique illuminator-detector pair, or the detector of the third unique illuminator-detector pair are a same detector.

In some embodiments, when executed, the at least one machine-executable instruction causes the at least one processor to estimate the respective position, in three-dimensional space, of each target of the plurality of targets by solving at least one optimization problem. In some embodiments, the at least one optimization problem comprises $$\min_{x,y,z} \sum_{p=1}^{n_1} \sum_{q=1}^{n_2} \left[ \sqrt{(x-x_{i_p})^2 + (y-y_{i_p})^2 + (z-z_{i_p})^2} + \sqrt{(x-x_{j_q})^2 + (y-y_{j_q})^2 + (z-z_{j_q})^2} - ct_{i_p j_q} \right]^2.$$

pair comprises a first pulse sequence transmitted during a time window, the optical signal emitted by the illuminator of the second unique illuminator-detector pair comprises a In some embodiments, when executed, the at least one machine-executable instruction causes the at least one processor to estimate the respective position, in three-dimensional space, of each target of the plurality of targets by determining whether at least one estimated distance in the first, second, or third distance set corresponds to a stored, pre-computed distance.

BRIEF DESCRIPTION OF THE DRAWINGS

Objects, features, and advantages of the disclosure will be readily apparent from the following description of certain embodiments taken in conjunction with the accompanying drawings in which:

FIGS. 7A, 7B, 7C, and 7D illustrate how an exemplary array of optical components can be used to determine the positions in three-dimensional space of multiple targets within a volume of space in accordance with some embodiments.

FIG. 9D illustrates the cross-correlation of the simple pulse sequences shown in FIG. 9A in accordance with some embodiments.

Figure 1A:
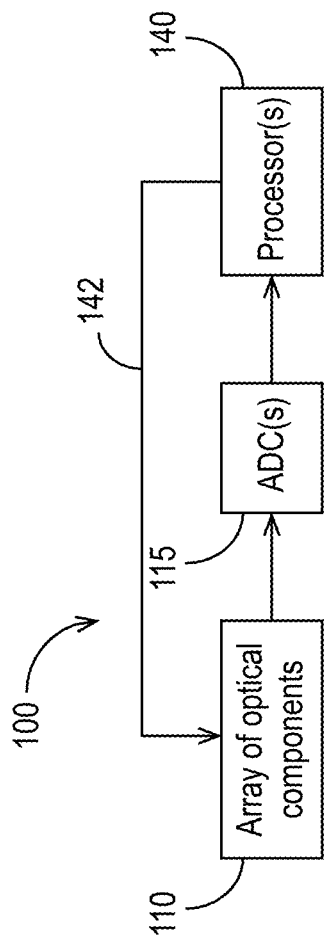
FIG. 1A is a block diagram of certain components of a MIMO LiDAR system in accordance with some embodiments.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are novel LiDAR systems and methods of using an array of optical components, namely a plurality of illuminators and a plurality of detectors, to detect the existence and coordinates of objects (also referred to herein as targets) in a scene. One application, among many others, of the disclosed LiDAR systems is for scene sensing in autonomous driving or for autonomous transportation.

The disclosed LiDAR systems include a plurality of illuminators (e.g., lasers) and a plurality of optical detectors (e.g., photodiodes, such as avalanche photodetectors). The illuminators and detectors are disposed in an array. Although the description herein refers to a single array (e.g., the array of optical components 110 described and discussed further below), it is to be understood that the illuminator and detector arrays may be separate (logically and/or physically), depending on how the illuminators and detectors are situated. To allow the LiDAR system to estimate the positions of objects in a scene being sensed, the array of optical components (or, if the illuminators and detectors are considered to be in separate arrays, at least one of the arrays (illuminator and/or detector)) is two-dimensional.

Because the positions of multiple targets (e.g., objects) in three-dimensional space are determined using multiple optical signals and/or reflections, the system is sometimes referred to herein as a multiple-input, multiple-output (MIMO) LiDAR system.

In the following description, some embodiments include pluralities of components or elements. These components or elements are referred to generally using a reference number alone (e.g., illuminator(s) 120, detector(s) 130), and specific instances of those components or elements are referred to and illustrated using a reference number followed by a letter (e.g., illuminator 120A, detector 130A). It is to be understood that the drawings may illustrate only specific instances of components or elements (with an appended letter), and the specification may refer to those illustrated components or elements generally (without an appended letter).

FIG. 1A is a diagram of certain components of a MIMO LiDAR system 100 in accordance with some embodiments. The system 100 includes an array of optical components 110 coupled to at least one processor 140. The array of optical components 110 may be in the same physical housing (or enclosure) as the at least one processor 140, or it may be physically separate.

The at least one processor 140 may be, for example, a digital signal processor, a microprocessor, a controller, an application-specific integrated circuit, or any other suitable hardware component (which may be suitable to process analog and/or digital signals). The at least one processor 140 may provide control signals 142 to the array of optical components 110. The control signals 142 may, for example, cause one or more illuminators in the array of optical components 110 to emit optical signals (e.g., light) sequentially or simultaneously. As described further below, the control signals 142 may cause the illuminators to emit optical signals in the form of pulse sequences, which may be different for different illuminators.

The system 100 may optionally also include one or more analog-to-digital converters (ADCs) 115 disposed between the array of optical components 110 and the at least one processor 140. If present, the one or more ADCs 115 convert analog signals provided by detectors in the array of optical components 110 to digital format for processing by the at least one processor 140. The analog signal provided by each of the detectors may be a superposition of reflected optical signals detected by that detector, which the at least one processor 140 may then process to determine the positions of targets corresponding to (causing) the reflected optical signals.

Figure 1B:
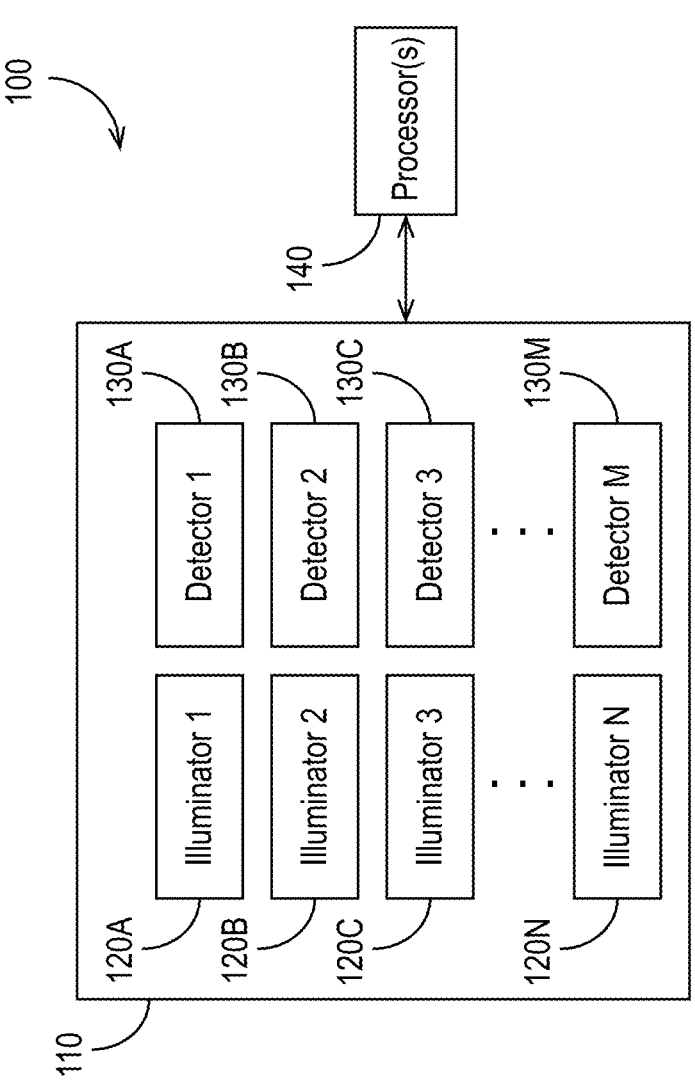
FIG. 1B is more detailed view of the array of optical components of a MIMO LiDAR system in accordance with some embodiments.

FIG. 1B is more detailed diagram of the array of optical components 110 of a MIMO LiDAR system 100 in accordance with some embodiments. As shown, the array of optical components 110 includes a plurality of illuminators 120 and a plurality of detectors 130. (As stated previously, the reference number 120 is used herein to refer to illuminators generally, and the reference number 120 with a letter appended is used to refer to individual illuminators. Similarly, the reference number 130 is used herein to refer to detectors generally, and the reference number 130 with a letter appended is used to refer to individual detectors.) Although FIG. 1B illustrates illuminators 120A, 120B, 120C, and 120N, thereby suggesting that there are fourteen illuminators 120 in the array of optical components 110, it is to be understood that, as used herein, the word "plurality" means "two or more." Therefore, the array of optical components 110 may include as few as two illuminators 120, or it may include any number of illuminators 120 greater than two. Likewise, although FIG. 1B illustrates detectors 130A, 130B, 130C, and 130M, thereby suggesting that there are thirteen detectors 130 in the array of optical components 110, it is to be understood that the array of optical components 110 may include as few as two detectors 130, or it may include any number of detectors 130 greater than two.

Figure 2A:
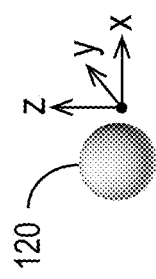
FIGS. 2A, 2B, and 2C depict an illuminator in accordance with some embodiments.
Figure 2B:
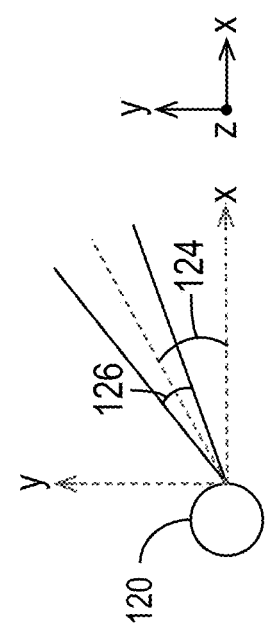
Figure 2C:
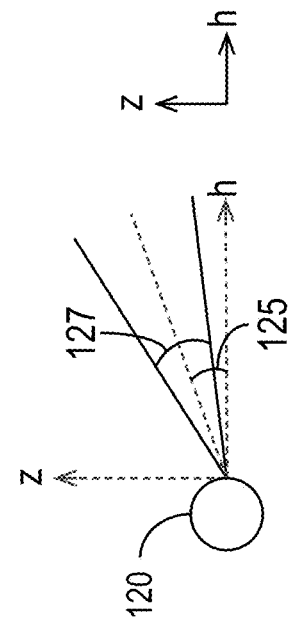

FIGS. 2A, 2B, and 2C depict an illuminator 120 in accordance with some embodiments. The illuminator 120 may be, for example, a laser and it could be operating at any wavelength, for example, 905 nm or 1550 nm. The illuminator 120 is shown having a spherical shape, which is merely symbolic. Throughout this document, solely to allow illuminators 120 and detectors 130 to be distinguished easily, illuminators 120 are shown as circular or spherical and detectors 130 are shown as cuboid or square. In an implementation, the illuminators 120 in the array of optical components 110 may be of any suitable size and shape. The illuminators 120 may be equipped with a lens (not shown) to focus and direct the optical signals it emits, as is known in the art. In addition, some or all of the illuminators 120 may also include one or more mirrors to direct the emitted optical signal in a specified direction. An illuminator 120 may also contain a diffuser to give its field of view (discussed further below) a specified shape (square, rectangle, circle, ellipse, etc.) and to promote uniformity of the transmitted beam across its field of view.

Each illuminator 120 in the array of optical components 110 has a position in three-dimensional space, which can be characterized by Cartesian coordinates (x, y, z) on x-, y-, and z-axes, as shown in FIG. 2A. Alternatively, any other coordinate system could be used (e.g., spherical).

As illustrated in FIG. 2B, in addition to having a position in three-dimensional space, each illuminator 120 has two azimuth angles: an azimuth boresight angle 124 and an azimuth field-of-view (FOV) angle 126. The azimuth angles (124, 126) are in a horizontal plane, which, using the coordinate system provided in FIG. 2A, is an x-y plane at some value of z. In other words, the azimuth boresight angle 124 and azimuth FOV angle 126 specify the "left-to-right" characteristics of optical signals emitted by the illuminator 120. The azimuth boresight angle 124 specifies the direction in which the illuminator 120 is pointed, which determines the general direction in which optical signals emitted by the illuminator 120 propagate. The azimuth FOV angle 126 specifies the angular width (e.g., beam width in the horizontal direction) of the portion of the scene illuminated by optical signals emitted by the illuminator 120.

As shown in FIG. 2C, each illuminator 120 also has two elevation angles: an elevation boresight angle 125 and an elevation FOV angle 127. The elevation angles are relative to a horizontal plane, which, using the coordinate system provided in FIG. 2A, is an x-y plane at some value of z. Accordingly, the horizontal axis shown in FIG. 2C is labeled "h" to indicate it is in some direction in an x-y plane that is not necessarily parallel to the x- or y-axis. (The direction of the "h" axis depends on the azimuth boresight angle 124.) The elevation boresight angle 125 and elevation FOV angle 127 specify the "up-and-down" characteristics of optical signals emitted by the illuminator 120. The elevation boresight angle 125 determines the height or altitude at which the illuminator 120 is pointed, which determines the general direction in which optical signals emitted by the illuminator 120 propagate. The elevation FOV angle 127 specifies the angular height (e.g., beam width in the vertical direction) of the portion of the scene illuminated by optical signals emitted by the illuminator 120.

The elevation FOV angle 127 of an illuminator 120 may be the same as or different from the azimuth FOV angle 126 of that illuminator 120. As will be understood by those having ordinary skill in the art, the beams emitted by illuminators 120 can have any suitable shape in three dimensions. For example, the emitted beams may be generally conical (where a cone is an object made up of a collection of (infinitely many) rays). The cross section of the cone can be any arbitrary shape, e.g., circular, ellipsoidal, square, rectangular, etc.).

The volume of space illuminated by an illuminator 120 having boresight angles 124, 125 and FOV angles 126, 127 is referred to herein as the illuminator FOV 122. Objects that are within the illuminator FOV 122 of a particular illuminator 120 are illuminated by optical signals transmitted by that illuminator 120. The illuminator FOV 122 of an illuminator 120 is dependent on and determined by the position of the illuminator 120 within the array of optical components 110, and the boresight angles 124, 125 and FOV angles 126, 127 of the illuminator 120. The range of the illuminator 120 is dependent on the optical power.

The array of optical components 110 includes a plurality of illuminators 120, which may be identical to each other, or they may differ in one or more characteristics. For example, different illuminators 120 have different positions in the array of optical components 110 and therefore in space (i.e., they have different (x, y, z) coordinates). The boresight angles 124, 125 and FOV angles 126, 127 of different illuminators 120 may also be the same or different. For example, as described further below, subsets of illuminators 120 may have configurations whereby they illuminate primarily targets within a certain range of the MIMO LiDAR system 100 and are used in connection with detectors 130 that are configured primarily to detect targets within that same range. Similarly, the power of optical signals emitted by different illuminators 120 can be the same or different. For example, illuminators 120 intended to illuminate targets far from the MIMO LiDAR system 100 may use more power than illuminators 120 intended to illuminate targets close to the MIMO LiDAR system 100. Another way to extend the range of targets illuminated by illuminators 120 is to incorporate repetition of transmitted pulse sequences (described further below) and/or to add/accumulate and/or average the received reflected signals at the detectors 130. This type of approach can increase the received SNR without increasing the transmit power.

As will be described further below, one novel aspect of the disclosed LiDAR systems 100 herein is that the boresight angles 124, 125 and the FOV angles 126, 127 of the illuminators 120 in the array of optical components 110 can be selected so that the beams emitted by different illuminators 120 overlap, thereby resulting in different illuminators 120 illuminating overlapping portions of a scene (and volumes of space). Unlike conventional LiDAR systems, the MIMO LiDAR systems 100 herein are able to resolve the three-dimensional positions of multiple targets within these overlapping regions of space. Moreover, they do not require any moving parts. The array of optical components 110 can be stationary.

Figure 3A:
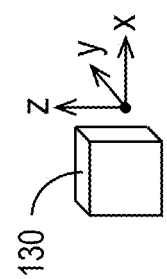
FIGS. 3A, 3B, and 3C depict a detector in accordance with some embodiments.
Figure 3B:
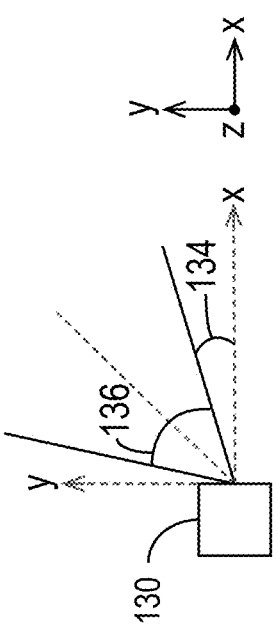
Figure 3C:
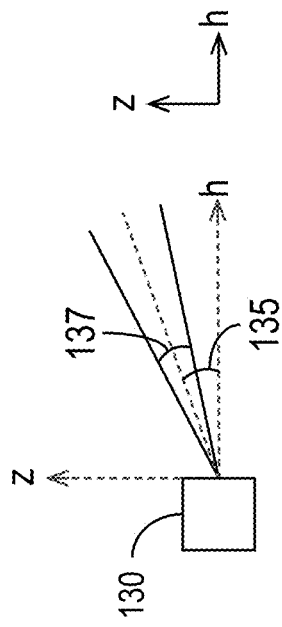

FIGS. 3A, 3B, and 3C depict a detector 130 in accordance with some embodiments. The detector 130 may be, for example, a photodetector. In some embodiments, the detector 130 is an avalanche photodiode. As will be appreciated by those having ordinary skill in the art, avalanche photodiodes operate under a high reverse-bias condition, which results in avalanche multiplication of the holes and electrons created by photon impact. As a photon enters the depletion region of the photodiode and creates an electron-hole pair, the created charge carriers are pulled away from each other by the electric field. Their velocity increases, and when they collide with the lattice, they create additional electron-hole pairs, which are then pulled away from each other, collide with the lattice, and create yet more electron-hole pairs, etc. The avalanche process increases the gain of the diode, which provides a higher sensitivity level than an ordinary diode. Like the illuminator 120, the detector 130 may include a lens to focus the received signal. In addition, like the illuminator 120, the detector 130 may include one or more mirrors to direct the received light in a selected direction.

The detector 130 is shown having a cuboid shape, which is merely symbolic. As explained above, throughout this document, solely to allow illuminators 120 and detectors 130 to be distinguished easily, illuminators 120 are shown as circular or spherical and detectors 130 are shown as cuboid or square. In an implementation, the detectors 130 in the array of optical components 110 may be of any suitable size and shape.

Each detector 130 in the array of optical components 110 has a position in three-dimensional space, which, as explained previously, can be characterized by Cartesian coordinates (x, y, z) on x-, y-, and z-axes, as shown in FIG. 3A. Alternatively, any other coordinate system could be used (e.g., spherical).

As illustrated in FIG. 3B, in addition to having a position in three-dimensional space, each detector 130 has two azimuth angles: an azimuth boresight angle 134 and an azimuth FOV angle 136. As is the case for the illuminators 120, the azimuth angles of the detectors 130 are in a horizontal plane, which, using the coordinate system provided in FIG. 3A, is an x-y plane at some value of z. In other words, the azimuth boresight angle 134 and azimuth FOV angle 136 specify the "left-to-right" positioning of the detector 130 (e.g., where in the horizontal plane it is "looking"). The azimuth boresight angle 124 specifies the direction in which the detector 130 is pointed, which determines the general direction in which it detects optical signals. The azimuth FOV angle 126 specifies the angular width in the horizontal direction of the portion of the scene sensed by the detector 130.

As shown in FIG. 3C, each detector 130 also has two elevation angles: an elevation boresight angle 135 and an elevation FOV angle 137. The elevation angles are relative to a horizontal plane, which, using the coordinate system provided in FIG. 3A, is an x-y plane at some value of z. Accordingly, the horizontal axis shown in FIG. 3C is labeled "h" to indicate it is in some direction in an x-y plane that is not necessarily parallel to the x- or y-axis. (The direction of the "h" axis depends on the azimuth boresight angle 134.) The elevation boresight angle 135 and elevation FOV angle 137 specify the "up-and-down" positioning of the detector 130. The elevation boresight angle 135 determines the height or altitude at which the detector 130 is directed, which determines the general direction in which it detects optical signals. The elevation FOV angle 137 specifies the angular height (e.g., beam width in the vertical direction) of the portion of the scene sensed by the detector 130. The elevation FOV angle 137 of a detector 130 may be the same as or different from the azimuth FOV angle 136 of that detector 130. In other words, the vertical span of the detector 130 may be the same as or different from its horizontal span.

The volume of space sensed by a detector 130 having boresight angles 134, 135 and FOV angles 136, 137 is referred to herein as a detector FOV 132. Optical signals reflected by objects within a particular detector 130's detector FOV 132 can be detected by that detector 130. The detector FOV 132 of a detector 130 is dependent on and determined by the position of the detector 130 within the array of optical components, and the boresight angles 134, 135 and FOV angles 136, 137 of the detector 130. The range of the detector 130 is dependent on the sensitivity of the detector 130.

The detectors 130 in the array of optical components 110 may be identical to each other, or they may differ in one or more characteristics. For example, different detectors 130 have different positions in the array of optical components 110 and therefore in space (i.e., they have different (x, y, z) coordinates). The boresight angles 134, 135 and FOV angles 136, 137 of different detectors 130 may also be the same or different. For example, as described further below, subsets of detectors 130 may have configurations whereby they observe targets within a certain range of the MIMO LiDAR system 100 and are used in connection with illuminators 120 that are configured primarily to illuminate targets within that same range.

As will be described further below, one novel aspect of the disclosed LiDAR systems 100 herein is that the boresight angles 134, 135 and the FOV angles 136, 137 of the detectors 130 in the array of optical components 110 can be selected so that they sense overlapping portions of a scene. Unlike conventional LiDAR systems, the MIMO LiDAR systems 100 herein are able to resolve the three-dimensional positions of multiple targets within these overlapping regions of space. Moreover, they do not require any moving parts. The array of optical components 110 can be stationary.

Figures 4A, 4B:
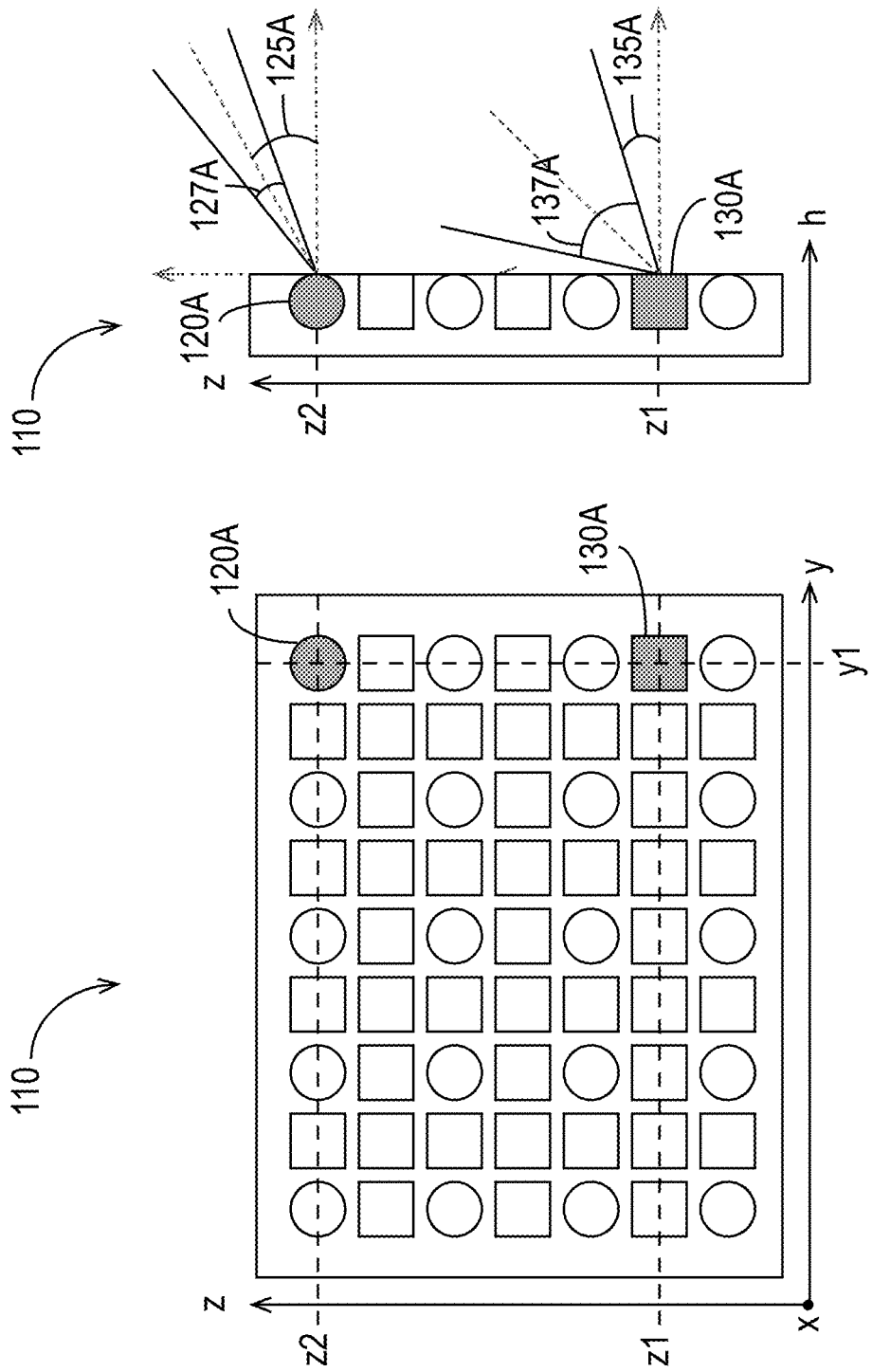
FIGS. 4A and 4B are representations of an array of optical components in accordance with some embodiments.

FIGS. 4A and 4B are representations of an array of optical components 110 in accordance with some embodiments. FIG. 4A is a "straight-on" view of the array of optical components 110 in a y-z plane, meaning that optical signals emitted by the illuminators 120 would come out of the page at various boresight angles 124, 125 and having various FOV angles 126, 127, and optical signals reflected by objects (targets) would be sensed by the detectors 130 having various boresight angles 134, 135 and having various FOV angles 136, 137 that also come out of the page. Per the convention described earlier, the illuminators 120 are represented by circles, most of which are unlabeled, and the detectors 130 are represented by squares, most of which are also unlabeled. The illustrated exemplary array of optical components 110 includes more detectors 130 than illuminators 120. As explained previously, an array of optical components 110 can have equal or unequal numbers of illuminators 120 and detectors 130. There may be, for example, more illuminators 120 than detectors 130. There may be an equal number of illuminators 120 and detectors 130. In general, the array of optical components 110 has a plurality of illuminators 120 (which may differ in various respects as described above) and a plurality of detectors 130 (which may differ in various respects as described above).

FIG. 4A labels one illuminator 120A, which has a position (coordinates) given by some value of x as well as y1 and z2. If the x-value is assumed to be 0, the position of the illuminator 120A in Cartesian coordinates is (0, y1, z2). FIG. 4A also labels one detector 130A, which has a position (0, y1, z1) under the assumption that the value of x is 0.

FIG. 4B is a simplified cross-sectional view of the array of optical components 110 at the position y1. The horizontal axis in FIG. 4B is labeled as "h," but it is to be noted that the elevation angles of the illuminator 120A and the detector 130A need not be at the same azimuth boresight angles 124, 134. In other words, as described above, different illuminators 120 and/or detectors 130 may be oriented in different directions. As shown, the illuminator 120A emits optical signals at an elevation boresight angle 125A with an elevation FOV 127A. Similarly, the detector 130A is oriented at an elevation boresight angle 135A and has an elevation FOV 137A.

Figure 5:
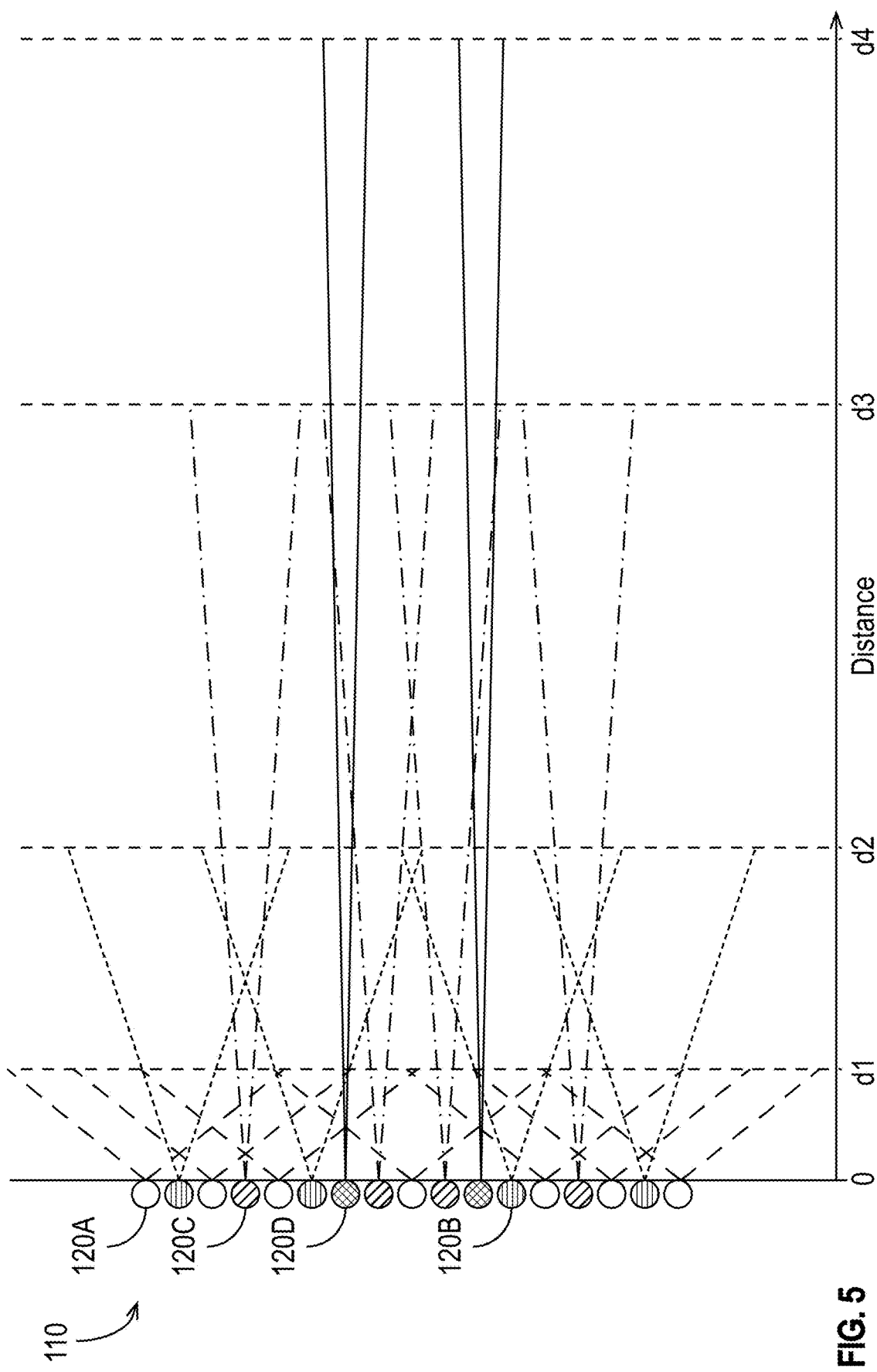
FIG. 5 shows how an exemplary MIMO LiDAR system can provide subsets of illuminators such that each subset is suitable for illuminating, and facilitating detection of, targets in a specified range.

In some embodiments, subsets of the illuminators 120 and/or detectors 130 have characteristics (e.g., boresight angles 124, 125, 134, 135 and FOV angles 126, 127, 136, 137) selected so certain combinations of illuminators 120 and/or detectors 130 respectively illuminate and/or sense objects in certain ranges (e.g., within a specified range of distances from the array of optical components 110). FIG. 5 shows how an exemplary MIMO LiDAR system 100 can provide subsets of illuminators 120 such that each subset is suitable for illuminating, and facilitating detection of, targets in a specified range in accordance with some embodiments. Although FIG. 5 illustrates illuminators 120, it is to be understood that the same principles described in reference to FIG. 5 apply to detectors 130. Specifically, the detectors 130 can likewise be configured in subsets that are suitable for detecting targets in specified ranges. In that sense, the illuminators 120 in FIG. 5 could be replaced by detectors 130.

FIG. 5 shows four distances on the horizontal axis, namely d1, d2, d3, and d4. Seven illuminators 120, including the illuminator 120A and others shown having no shading, are in a first subset of illuminators 120 that illuminate targets close to the array of optical components 110 of a MIMO LiDAR system 100. Specifically, the boresight angles 124, 125 and FOV angles 126, 127 of the illuminator 120A and other illuminators 120 that are unshaded are selected so that they are most likely to illuminate (and allow detection of) targets in the distance range of 0 to d1 from the array of optical components 110. Four illuminators 120, including the illuminator 120B and others shown having horizontally-striped shading, are in a second subset of illuminators 120 that have boresight angles 124, 125 and FOV angles 126, 127 selected so that they are most likely to illuminate (and allow detection of) targets in the distance range of 0 to d2 from the array of optical components 110. Four illuminators 120, including the illuminator 120C and others shown having diagonal-stripe shading, are in a third subset of illuminators 120 that have boresight angles 124, 125 and FOV angles 126, 127 selected so that they are most likely to illuminate (and allow detection of) targets in the distance range of 0 to d3 from the array of optical components 110. Two illuminators, including the illuminator 120D and the other illuminator shown with a cross-hatched shading, are in a fourth subset of illuminators 120 that have boresight angles 124, 125 and FOV angles 126, 127 selected so that they are most likely to illuminate (and allow detection of) targets in the distance range of 0 to d4 from the array of optical components 110. As shown (but not labeled to avoid obscuring the drawing), the FOV angles 126, 127 of the illuminators 120 in the first subset are larger than the FOV angles 126, 126 of the illuminators 120 in the second, third, and fourth subsets. Likewise, the FOV angles 126, 127 of the illuminators 120 in the second subset are larger than the FOV angles 126, 126 of the illuminators 120 in the third and fourth subsets, and the FOV angles 126, 127 of the illuminators 120 in the third subset are larger than the FOV angles 126, 126 of the illuminators 120 in the fourth subset.

It is to be appreciated that FIG. 5 is a two-dimensional representation, and that the discussion above assumes that FIG. 5 illustrates the azimuth boresight angles 124, 125 and FOV angles 126, 127. The discussion above applies equally for elevation, and FIG. 5 could just as well illustrate elevation. It is also to be appreciated that FIG. 5 is meant to be illustrative and is not necessarily representative of how a real MIMO LiDAR system 100 would be configured. For example, an implementation might have detectors 130 interspersed between or distributed among illuminators 120 (e.g., uniformly or non-uniformly, regularly or irregularly, etc.). Furthermore, FIG. 5 is limited to two dimensions and only illustrates a "cross-section" of a collection of illuminators 120 of a MIMO LiDAR system 100. As explained further below, the illuminator(s) 120 and detector(s) 130 used to determine the positions (coordinates) of targets in a specified volume of space are non-collinear, which FIG. 5 does not illustrate. FIG. 5 also does not illustrate any detectors 130 or any other components, optical or otherwise, of the MIMO LiDAR system 100. Additional optical components (e.g., illuminators 120, detectors 130) may be, for example, above, below, to the sides of, and/or interspersed between the illuminators 120 in the array of optical components 110 illustrated in FIG. 5.

As a specific example of the principles illustrated in FIG. 5, a first subset of illuminators 120 may have boresight angles 124, 125, FOV angles 126, 127, power levels, and other characteristics selected so that the emitted optical signals are intended to illuminate all objects in a first range (e.g., 10 to 50 meters) from the MIMO LiDAR system 100, and a first subset of detectors 130 may have boresight angles 134, 135, FOV angles 136, 137, and other characteristics (e.g., sensitivity) selected to sense objects in the first range. The boresight angles 124, 125, 134, 135 and/or FOV angles 126, 127, 136, 137 for the first subset of illuminators 120 and the first subset of detectors 130 can be the same as or different from each other. For example, all of the boresight angles 124, 125, 134, 135 could be 0 degrees (perpendicular to the array of optical components 110, aimed "straight ahead"), and the FOV angles 126, 127, 136, 137 for the first subset of illuminators 120 and for the first subset of detectors 130 could be, for example, 90 degrees (resulting in "straight-ahead" boresight and a field of view 45 degrees to either side and up and down (e.g., ±45 degrees)). A second subset of illuminators 120 may have boresight angles 124, 125, FOV angles 126, 127, power levels, and other characteristics selected so that the emitted optical signals are intended to illuminate objects in the range of 50 to 200 meters, and a second subset of detectors 130 may have boresight angles 134, 135, FOV angles 136, 137, and other characteristics selected to sense objects in the second range. The boresight angles 124, 125, 134, 135 for the second subset of illuminators 120 and the second subset of detectors 130 could be, for example, 0 degrees (perpendicular to the array of optical components 110, aimed "straight ahead"), and the FOV angles 126, 127, 136, 137 for the second subset of illuminators 120 and for the second subset of detectors 130 could be, for example, 40 degrees (resulting in "straight-ahead" boresight and a field of view 20 degrees to either side and up and down (e.g., ±20 degrees)). This strategy may result in improved performance and/or a more efficient system. For example, because scattered optical power degrades as the square of the distance, the first subset of illuminators 120, which targets a closer range, may be configured to use less power than the second set of illuminators 120. In addition to different subsets of illuminators 120 using different power levels, different subsets of illuminators 120, or even different individual illuminators 120, can use different repetition patterns of the transmitted pulses for each range of interest to increase the received SNR. For example, the detectors 130 can simply add/accumulate, or average, their respective received signals.

In some embodiments, the positions, power levels, boresight angles 124, 125, and FOV angles 126, 127 of the illuminators 120 in the array of optical components 110 are selected such that at least some subset of illuminators 120 fully illuminates the entirety of a volume of three-dimensional space. For example, a particular volume of space may be defined as the volume of three-dimensional space between 5 and 20 meters from the array of optical components 110 and extending from 10 meters to the left and 10 meters to the right, and from ground level to 10 meters above the ground. In some embodiments, every point in the selected volume of space can be illuminated by optical signals emitted by at least one illuminator 120 in the array of optical components 110. As a result, any object in that volume of space can be illuminated by at least one illuminator 120.

Likewise, in some embodiments, the positions, boresight angles 134, 135, and FOV angles 136, 137 of the detectors 130 in the array of optical components 110 are selected such that the set of detectors 130 senses the entirety of a volume of three-dimensional space. Thus, every point in the volume of space can be observed by at least one detector 130.

It is possible to determine the positions in three-dimensional space of targets within a volume of space using a plurality of optical components (e.g., from the array of optical components 110). If the number of illuminators 120 illuminating a specified point in the volume of space is denoted as $n_1$ and the number of detectors 130 observing that specified point is denoted as $n_2$, the position of the point can be determined as long as (1) the product of the number of illuminators 120 illuminating that point and the number of detectors 130 observing that point is greater than 2 (i.e., $n_1 \times n_2 > 2$), and (2) the collection of $n_1$ illuminators 120 and $n_2$ detectors 130 is non-collinear (i.e., not all of the $n_1$ illuminator(s) 120 and $n_2$ detector(s) 130 are arranged in a single straight line, or, stated another way, at least one of the $n_1$ illuminator(s) 120 and $n_2$ detector(s) 130 is not on the same straight line as the rest of the $n_1$ illuminator(s) 120 and $n_2$ detector(s) 130). These conditions allow three independent equations to be determined so that the position of each target in the volume of space illuminated by the illuminator(s) 120 and observed by the detector(s) 130 can be determined unambiguously.

There are various combinations of $n_1$ illuminators 120 and $n_2$ detectors 130 that can be used to meet the first condition, $n_1 \times n_2 > 2$. For example, one combination can include one illuminator 120 and three detectors 130. Another combination can include three illuminators 120 and one detector 130. Still another combination can use two illuminators 120 and two detectors 130. Any other combination of $n_1$ illuminators 120 and $n_2$ detectors 130, situated non-collinearly, that meets the condition $n_1 \times n_2 > 2$ can be used.

Each collection of $n_1$ illuminators 120 and $n_2$ detectors 130 meeting the condition $n_1 \times n_2 > 2$ includes at least three unique illuminator-detector pairs, meaning that for any selected unique illuminator-detector pair, the identity of the illuminator 120 of the pair and/or the identity of the detector 130 of the pair is different from the corresponding component of every other unique illuminator-detector pair in the collection of $n_1$ illuminators 120 and $n_2$ detectors 130. FIGS. 6A, 6B, 6C, and 6D illustrate several configurations of unique illuminator-detector pairs in collections of $n_1$ illuminators 120 and $n_2$ detectors 130 meeting the condition $n_1 \times n_2 > 2$.

Figure 6A:
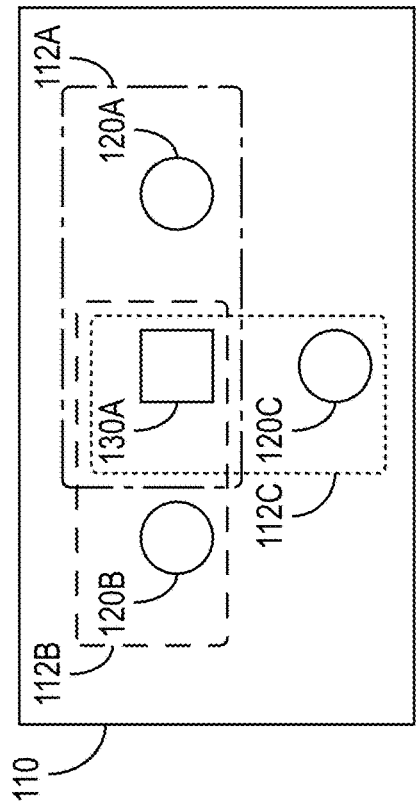
FIGS. 6A, 6B, 6C, and 6D illustrate several configurations of unique illuminator-detector pairs in accordance with some embodiments.

FIG. 6A is an exemplary configuration that includes three illuminators 120A, 120B, and 120C, and three detectors 130A, 130B, and 130C in accordance with some embodiments. The three illuminators 120A, 120B, and 120C, and three detectors 130A, 130B, and 130C have been assigned to unique illuminator-detector pairs 112A, 112B, and 112C. In the example of FIG. 6A, the three unique illuminator-detector pairs 112A, 112B, and 112C share no common optical components. Instead, each illuminator 120 is assigned to a separate unique illuminator-detector pair 112, and each detector 130 is also assigned to a separate unique illuminator-detector pair 112. The condition $n_1 \times n_2 > 2$ is satisfied (3×3=9), and the collection of three illuminators 120A, 120B, and 120C and three detectors 130A, 130B, and 130C is non-collinear (because the illuminators 120A, 120B, and 120C and the detectors 130A, 130B, and 130C are not all arranged in a single straight line). Assuming the illuminator FOVs 122A, 122B, 122C and the detector FOVs 132A, 132B, 132C intersect (thereby establishing a volume of space), the arrangement shown in FIG. 6A will provide at least three independent equations that can be solved to determine the position of an object in the intersecting volume of space illuminated by the illuminators 120A, 120B, 120C and sensed by the detectors 130A, 130B, and 130C.

Figure 6B:
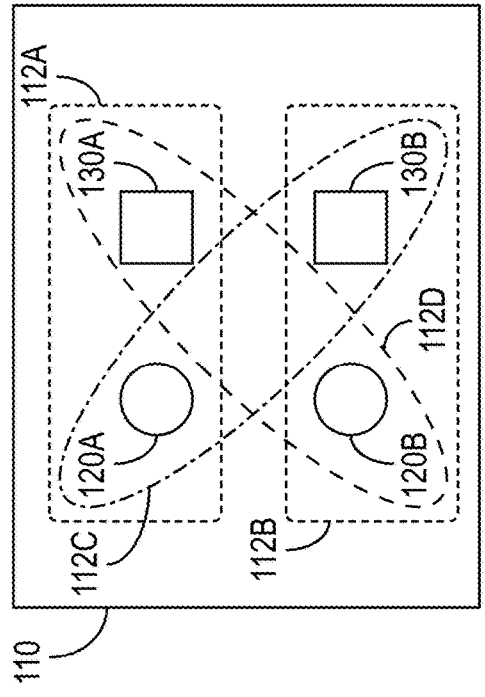

FIG. 6B illustrates another exemplary configuration that provides three independent equations using only four optical components in accordance with some embodiments, namely one illuminator 120A and three detectors 130A, 130B, and 130C. The illuminator 120A and detectors 130A, 130B, and 130C have been assigned to unique illuminator-detector pairs 112A, 112B, and 112C. In the example of FIG. 6B, each of the three unique illuminator-detector pairs 112A, 112B, and 112C includes the illuminator 120A and a different detector 130. Specifically, the unique illuminator-detector pair 112A includes the illuminator 120A and the detector 130A; the unique illuminator-detector pair 112B includes the illuminator 120A and the detector 130B; and the unique illuminator-detector pair 112C includes the illuminator 120A and the detector 130C. The condition $n_1 \times n_2 > 2$ is satisfied (1×3=3), and the collection of the illuminator 120A and the three detectors 130A, 130B, and 130C is non-collinear (i.e., the illuminator 120A and the detectors 130A, 130B, and 130C are not all arranged in a single straight line). Assuming the illuminator FOV 122A and the detector FOVs 132A, 132B, 132C intersect, the arrangement shown in FIG. 6B will provide three independent equations that can be solved to determine the position of an object in the intersecting volume of space illuminated by the illuminator 120A and observed by the detectors 130A, 130B, and 130C.

Figure 6C:
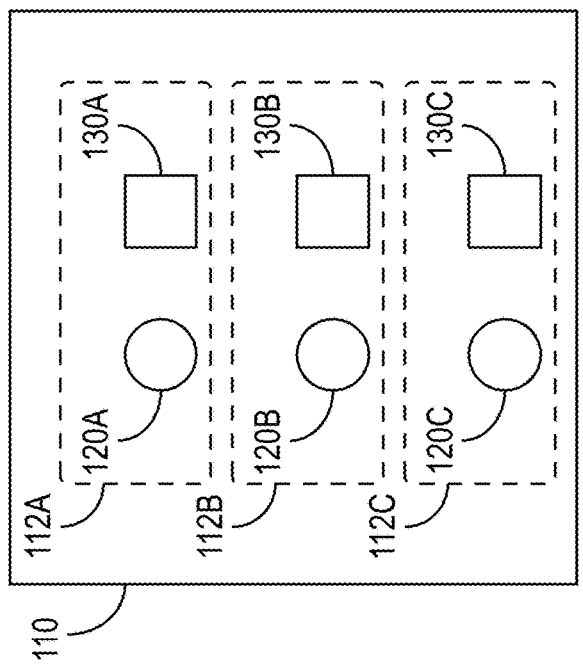

FIG. 6C illustrates another exemplary configuration that provides three independent equations using only four optical components, namely three illuminators 120A, 120B, and 120C, and one detector 130A. The illuminators 120A, 120B, and 120C and the detector 130A have been assigned to unique illuminator-detector pairs 112A, 112B, and 112C. In the example of FIG. 6C, each of the three unique illuminator-detector pairs 112A, 112B, and 112C includes the detector 130A and a different illuminator 120. Specifically, the unique illuminator-detector pair 112A includes the illuminator 120A and the detector 130A; the unique illuminator-detector pair 112B includes the illuminator 120B and the detector 130A; and the unique illuminator-detector pair 112C includes the illuminator 120C and the detector 130A. The condition $n_1 \times n_2 > 2$ is satisfied ($3 \times 1 = 3$), and the collection of the illuminators 120A, 120B, and 120C and the detector 130A is non-collinear (i.e., the illuminators 120A, 120B, and 120C and the detector 130A are not all arranged in a single straight line). Assuming the illuminator FOVs 122A, 122B, and 122C and the detector FOV 132A intersect, the arrangement shown in FIG. 6C will provide three independent equations that can be solved to determine the position of an object in the intersecting volume of space illuminated by the illuminators 120A, 120B, and 120C and observed by the detector 130A.

Figure 6D:
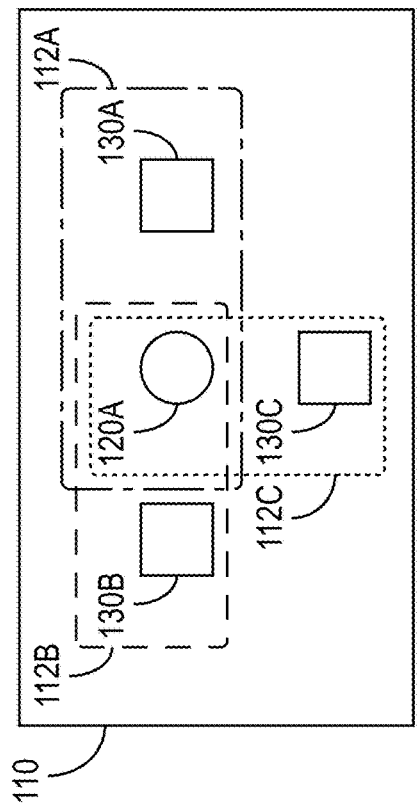

FIG. 6D illustrates yet another exemplary configuration that provides four equations, of which three are independent and one is redundant (where the redundant equation allows for a more accurate determination of the target locations in the presence of noise), using four optical components, namely two illuminators 120A, 120B and two detectors 130A, 130B. The illuminators 120A, 120B and the detectors 130A, 130B have been assigned to unique illuminator-detector pairs 112A, 112B, 112C, and 112D. In the example of FIG. 6D, each of the four unique illuminator-detector pairs 112A, 112B, 112C, and 112D includes a unique combination of one of the illuminators 120 and one of the detectors 130. Specifically, the unique illuminator-detector pair 112A includes the illuminator 120A and the detector 130A; the unique illuminator-detector pair 112B includes the illuminator 120B and the detector 130B; the unique illuminator-detector pair 112C includes the illuminator 120A and the detector 130B; and the unique illuminator-detector pair 112D includes the illuminator 120B and the detector 130A. The condition $n_1 \times n_2 > 2$ is satisfied ($2 \times 2 = 4$), and the collection of the illuminators 120A, 120B and the detectors 130A, 130B is non-collinear (i.e., the illuminators 120A, 120B and the detectors 130A, 130B are not all arranged in a single straight line). Assuming the illuminator FOVs 122A and 122B and the detector FOVs 132A and 132B intersect, the arrangement shown in FIG. 6D will provide four equations, of which three are independent and one is redundant, that can be solved to determine the position of an object in the intersecting volume of space illuminated by the illuminators 120A and 120B and sensed by the detectors 130A and 130B. The available fourth redundant equation resulting from the use of two illuminators 120 and two detectors 130 can be used to improve the accuracy of the estimated positions of targets within the volume of space.

Figure 7D:
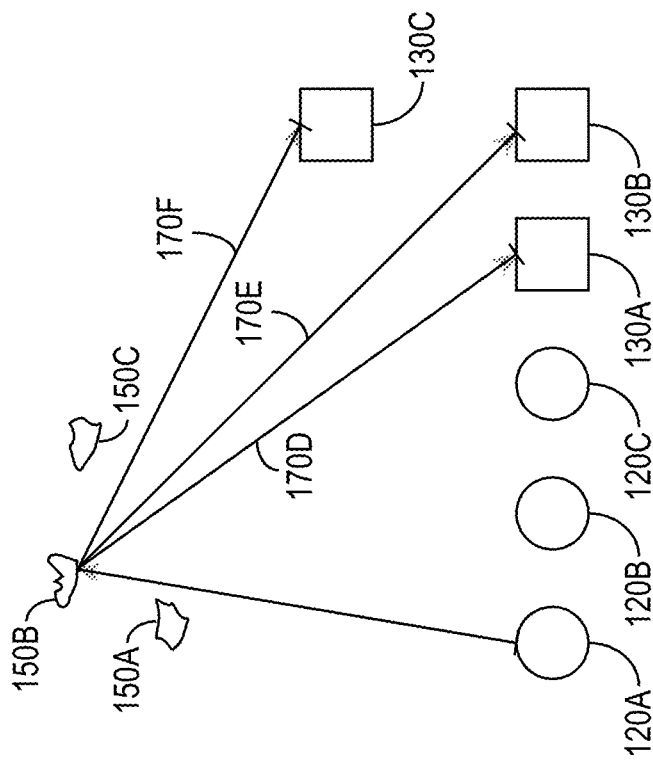

FIGS. 7A, 7B, 7C, and 7D illustrate how unique illuminator-detector pairs 112 can be used to determine the positions in three-dimensional space of multiple targets within a volume of space in accordance with some embodiments. FIG. 7A illustrates a MIMO LiDAR system 100 that includes three illuminators 120A, 120B, and 120C and three detectors 130A, 130B, and 130C. In this example, a single illuminator 120A illuminates a volume of space 160, and three detectors 130A, 130B, and 130C observe the volume of space 160. The illuminator 120A has an illuminator FOV 122, illustrated for convenience as an angle, and the detectors 130A, 130B, and 130C have, respectively, detector FOVs 132A, 132B, and 132C, which are also illustrated, for convenience, as angles. Each of the detector FOVs 132A, 132B, and 132C shown in FIG. 7A intersects at least a portion of the illuminator FOV 122. Therefore, FIG. 7A shows three exemplary unique illuminator-detector pairs 112. One unique illuminator-detector pair 112 is the illuminator 120A and the detector 130A; a second unique illuminator-detector pair 112 is the illuminator 120A and the detector 130B; and a third unique illuminator-detector pair 112 is the illuminator 120A and the detector 130C.

The intersection of the illuminator FOV 122 and each of the detector FOVs 132A, 132B, and 132C is the volume of space 160. Although FIG. 7A illustrates only two dimensions, it is to be understood that the illuminator FOV 122, the detector FOVs 132A, 132B, and 132C, and the volume of space 160 are all, in general, three-dimensional.

FIG. 7A illustrates three targets, 150A, 150B, and 150C within the range of the MIMO LiDAR system 100. The targets 150A and 150B are within the volume of space 160 defined by the illuminator FOV 122 and the detector FOVs 132A, 132B, and 132C, and, therefore, the positions of the targets 150A and 150B within the volume of space 160 can be determined as described further below. The target 150C is in a region that is not illuminated by the illuminator 120A. Thus, its position cannot be determined using the illuminator 120A (at least not with the illustrated illuminator FOV 122).

To determine the positions of the targets 150A and 150B, the MIMO LiDAR system 100 determines, for each unique illuminator-detector pair 112, a distance set. The distance set for a unique illuminator-detector pair 112 is a set of distances. Each distance in the distance set is an estimate of the distance traversed by an optical signal emitted by the illuminator 120 of the unique illuminator-detector pair 112, reflected by a target in the volume of space 160, and detected by the detector 130 of the unique illuminator-detector pair 112. In general, if there are N targets in the volume of space 160, the distance set for each of the unique illuminator-detector pairs 112 will include N estimated distances.

It is to be understood that because the illuminators 120 of the MIMO LiDAR system 100 emit, and the detectors 130 detect, optical signals, distances traveled by optical signals are easily computed from times-of-flight by multiplying the times-of-flight by the speed of light. Thus, the distance set is not strictly required to contain distances (e.g., estimates in units of distance). Instead, or in addition, it can include round-trip times of emitted signals. In other words, the term "distance set" is not limited to estimates of physical distances. Any proxy (such as round-trip time) from which the positions or coordinates of targets in the volume of space can be determined as described further below can be used as the distance set.

Figure 7C:
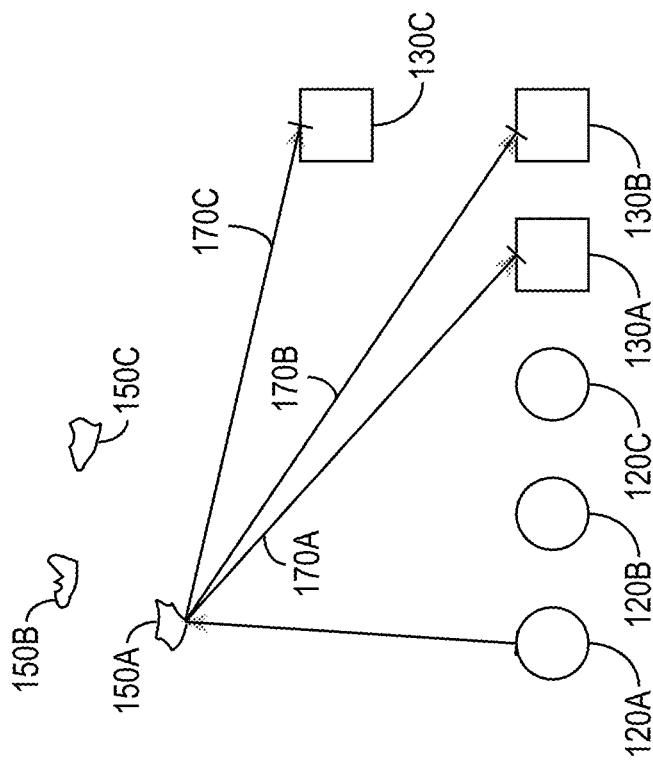

FIG. 7B illustrates rays 121 that represent optical signals emitted by the illuminator 120A, reflected by the targets 150A and 150B, and detected by the detectors 130A, 130B, and 130C. FIG. 7C illustrates the distances traversed by the optical signals between the illuminator 120A, the target 150A, and the detectors 130A, 130B, and 130C. Specifically, the optical signal emitted by the illuminator 120A and reflected by the target 150A traverses a distance 170A before being detected by the detector 130A, distance 170B before being detected by the detector 130B, and a distance 170C before being detected by the detector 130C.

As explained in the context of FIGS. 1A and 1B, the MIMO LiDAR system 100 includes at least one processor 140 coupled to the array of optical components 110. The at least one processor 140 can estimate the distances 170A, 170B, and 170C from the times of flight of the optical signal emitted by the illuminator 120A. In other words, knowing when the illuminator 120A emitted the optical signal, the at least one processor 140 can use the arrival times of the optical signals at the detectors 130A, 130B, and 130C to estimate the distances 170A, 170B, and 170C by multiplying the respective times of flight of the optical signals by the speed of light ($3\times10^8$ m/s).

The estimated distance corresponding to each unique illuminator-detector pair 112 defines an ellipsoid that has one focal point at the coordinates of the illuminator 120 of the unique illuminator-detector pair 112 and the other focal point at the coordinates of the detector 130 of the unique illuminator-detector pair 112. The ellipsoid is defined as those points in space whose sums of distances from the two focal points are given by the estimated distance. The detected target resides somewhere on this ellipsoid. For example, referring again to FIG. 7C, the target 150A resides on each of three ellipsoids. Each of the three ellipsoids has one focal point at the coordinates of the illuminator 120A. A first ellipsoid has its other focal point at the coordinates of the detector 130A. A second ellipsoid has its other focal point at the coordinates of the detector 130B. A third ellipsoid has its other focal point at the coordinates of the detector 130C. Because the collection of the illuminator 120A and the detectors 130A, 130B, and 130C is non-collinear, and the target 150A resides on each of the ellipsoids, the position of the target 150A is at the intersection of the three ellipsoids that lies within the volume of space 160. This intersection, and, therefore, the coordinates of the target 150A, can be determined by solving a system of quadratic equations. An exemplary procedure suitable for use with an arbitrary number of illuminators 120 and an arbitrary number of detectors 130 (as long as the conditions $n_1 \times n_2 > 2$ and non-collinearity of the set of illuminators 120 and detectors 130 are satisfied) is described later in this document.

FIG. 7D illustrates the distances traversed by the optical signals between the illuminator 120A, the target 150B, and the detectors 130A, 130B, and 130C. Specifically, the optical signal emitted by the illuminator 120A and reflected by the target 150B traverses a distance 170D before being detected by the detector 130A, a distance 170E before being detected by the detector 130B, and a distance 170F before being detected by the detector 130C. As explained in the discussion of FIG. 7C, the at least one processor 140 knows when the illuminator 120A emitted the optical signal, and it can use the arrival times of the optical signals at the detectors 130A, 130B, and 130C to estimate the distances 170D, 170E, and 170F by multiplying the respective times of flight of the optical signals by the speed of light. The target 150B resides on each of three ellipsoids, each of which has one focal point at the coordinates of the illuminator 120A and its other focal point at, respectively, the coordinates of the detector 130A, 130B, or 130C. The position of the target 150B is at the intersection of these three ellipsoids that lies in the volume of space 160. This intersection, and, therefore, the coordinates of the target 150B, can be determined by solving another system of quadratic equations, as described further below.

FIGS. 7A through 7D, and the discussion above, described an exemplary MIMO LiDAR system 100 that uses one illuminator 120 and three detectors 130 to determine the positions of targets 150 within a volume of space 160. As explained above, there are other combinations of numbers of illuminators 120 and detectors 130 that can also be used (e.g., three illuminators and one detector, two illuminators and two detectors, etc.). Any combination of illuminators 120 and detectors 130 that meets the conditions of $n_1 \times n_2 > 2$ and non-collinearity of the set of illuminators 120 and detectors 130 can be used.

Figure 8B:
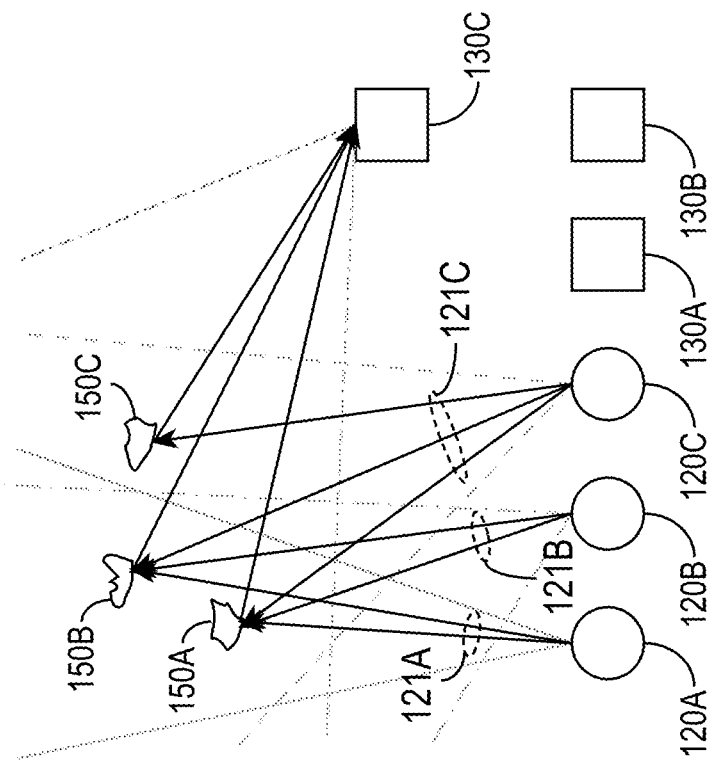
FIGS. 8A, 8B, 8C, and 8D illustrate how an exemplary MIMO LiDAR system can use three illuminators and one detector to determine the positions of targets in a volume of space in accordance with some embodiments.
Figure 8A:
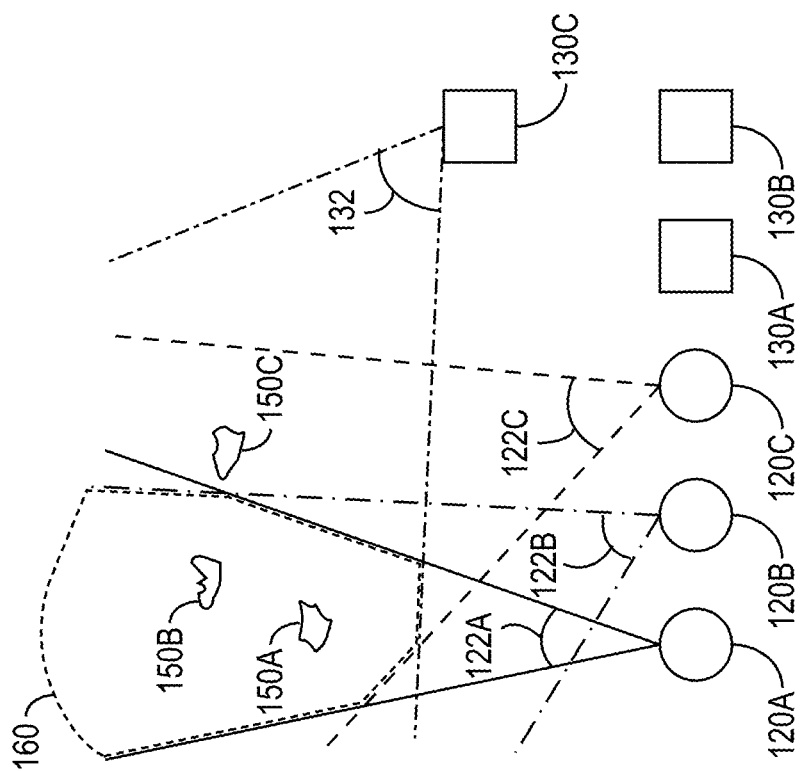

FIGS. 8A, 8B, 8C, and 8D illustrate how another exemplary MIMO LiDAR system 100 can use three illuminators 120 and one detector 130 to determine the positions of targets 150 in the volume of space 160. Specifically, as illustrated in FIG. 8A, three illuminators 120A, 120B, and 120C illuminate a volume of space 160, and one detector 130C detects optical signals reflected by targets 150 within the volume of space 160. As previously described, the volume of space 160 is the intersection of the illuminator FOVs 122A, 122B, and 122C, and the detector FOV 132. The detector FOV 132 intersects at least a portion of each illuminator FOVs 122A, 122B, and 122C. FIG. 8A shows three exemplary unique illuminator-detector pairs 112. One unique illuminator-detector pair 112 is the illuminator 120A and the detector 130C; a second unique illuminator-detector pair 112 is the illuminator 120B and the detector 130C; and a third unique illuminator-detector pair 112 is the illuminator 120C and the detector 130C.

The intersection of the illuminator FOVs 122A, 122B, and 122C and the detector FOV 132 is the volume of space 160. Although FIG. 8A illustrates only two dimensions, it is to be understood that the illuminator FOVs 122A, 122B, and 122C, the detector FOV 132, and the volume of space 160 are all, in general, three-dimensional.

FIG. 8A illustrates three targets, 150A, 150B, and 150C within the range of the MIMO LiDAR system 100. The targets 150A and 150B are within the volume of space 160 defined by the illuminator FOVs 122A, 122B, and 122C, and the detector FOV 132, and, therefore, the positions of the targets 150A and 150B within the volume of space 160 can be determined as described further below.

As illustrated in FIG. 8A, the target 150C is in a region that is illuminated by the illuminator 120C and detected by the detector 130C, but because it is not illuminated by either illuminator 120A or 120B, its position cannot be determined using only the set of optical components whose FOVs are shown in FIG. 8A (namely, illuminators 120A, 120B, 120C and detector 130C). It is to be understood that if, for example, the detectors 130A and 130B can sense a volume of space that includes the position of the target 150C, then the illuminator 120C and the detectors 130A, 130B, and 130C could be used to determine the coordinates of the target 150C in a manner described in the context of FIGS. 7A through 7D. Likewise, any set of optical components (illuminator(s) 120 and detector(s) 130) meeting the conditions of $n_1 \times n_2 > 2$ and non-collinearity of the set of illuminators 120 and detectors 130 that results in a volume of space 160 that includes the target 150C can be used to determine the position of the target 150C.

To determine the positions of the targets 150A and 150B, the MIMO LiDAR system 100 determines, for each unique illuminator-detector pair 112, a distance set as described above. FIG. 8B illustrates rays that represent optical signals emitted by the illuminators 120A, 120B, and 120C, reflected by the targets 150A and 150B, and detected by the detector 130C. The illuminator 120A emits an optical signal represented by the rays 121A, which is reflected by both the target 150A and the target 150B, and then detected by the detector 130C. Similarly, the illuminator 120B emits an optical signal represented by the rays 121B, which is reflected by both the target 150A and the target 150B, and then detected by the detector 130C. The illuminator 120C emits an optical signal represented by the rays 121C, which is reflected by all of the targets 150A 150B, and 150C because the illuminator FOV 122C encompasses the region where the target 150C is situated. The reflected signals are then detected by the detector 130C.

Figure 8D:
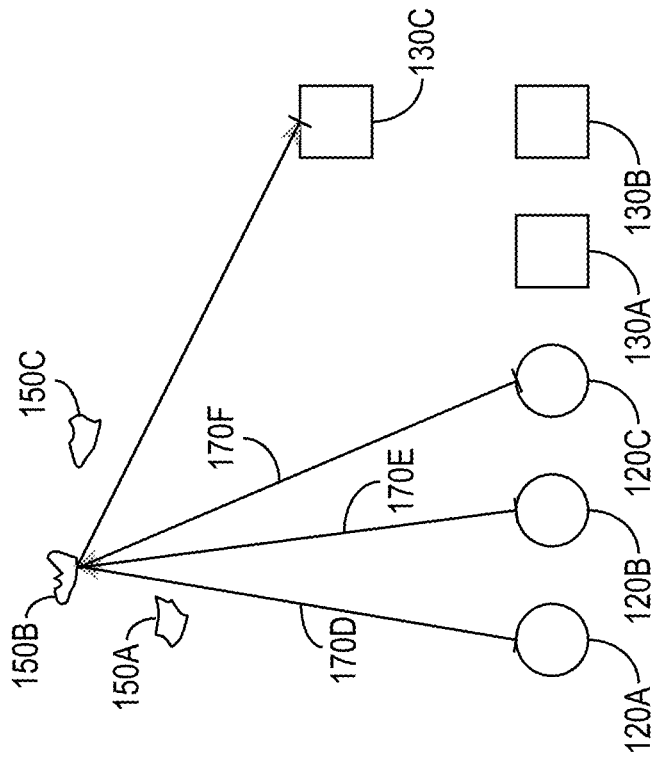
Figure 8C:
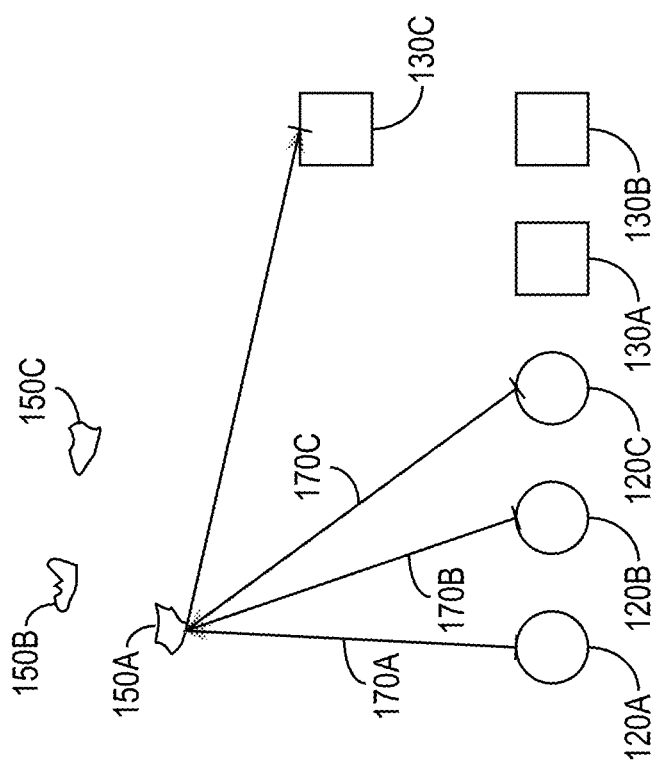

FIG. 8C illustrates the distances traversed by the optical signals between the illuminators 120A, 120B, and 120C, the target 150A, and the detector 130C. Specifically, the optical signal emitted by the illuminator 120A and reflected by the target 150A traverses a distance 170A before being detected by the detector 130C. The optical signal emitted by the illuminator 120B and reflected by the target 150A traverses a distance 170B before being detected by the detector 130C, and the optical signal emitted by the illuminator 120C and reflected by the target 150A traverses a distance 170C before being detected by the detector 130C.

FIG. 8D illustrates the distances traversed by the optical signals between the illuminators 120A, 120B, and 120C, the target 150B, and the detector 130C. Specifically, the optical signal emitted by the illuminator 120A and reflected by the target 150B traverses a distance 170D before being detected by the detector 130C. The optical signal emitted by the illuminator 120B and reflected by the target 150B traverses a distance 170E before being detected by the detector 130C, and the optical signal emitted by the illuminator 120C and reflected by the target 150B traverses a distance 170F before being detected by the detector 130C.

As explained above, the at least one processor 140 can estimate the distances 170A, 170B, 170C, 170D, 170E, and 170F from the times of flight. In this case, however, if the three illuminators 120A, 120B, and 120C transmit identical optical signals at the same time, the detector 130C may be unable to determine which detected optical signal corresponds to which illuminator 120 and to which target 150. In general, if two or more illuminators 120 emit optical signals at the same time and in overlapping illuminator FOVs 122, there is the potential for detectors 130 sensing targets 150 in the common region to be confused and/or unable to resolve targets 150.

One solution is for the three illuminators 120A, 120B, and 120C to transmit identical optical signals but at different times so that the identity of the illuminator 120 responsible for a reflected optical signal is known or can be determined or estimated. For example, if two illuminators 120 emit optical signals at different times (e.g., in round-robin or TDMA fashion), or if they illuminate different, non-overlapping fields of view, the optical signals they emit can be identical.

Another solution is for each illuminator 120 to transmit an optical signal that is distinguishable from all other optical signals transmitted at the same time and within the same volume of space 160. Thus, in some embodiments, the optical signals, of those illuminators 120 that illuminate the same volume of space 160 and that transmit simultaneously, comprise unique pulse sequences. The pulse sequence used by a particular illuminator 120 may be globally unique (used by only one illuminator 120 in the entire array of optical components 110), or it may be locally unique (used by multiple illuminators 120 such that identical pulse sequences are never present in any volume of space 160) at the same time.

Thus, in some embodiments, two or more illuminators 120 emit optical signals at the same time (or in the same time window) and also illuminate overlapping illuminator FOVs 122. In some such embodiments, different illuminators 120 use different pulse sequences designed to allow one or more detectors 130 to distinguish between the pulse sequences of different illuminators 120.

Because the illuminators 120 emit optical signals, the pulse sequences have an instantaneous magnitude, but indeterminate phase, at any selected time. In other words, they operate in a non-coherent fashion. In some embodiments, the pulse sequences are sparse, meaning that in a specified window of time, each pulse sequence includes only a few pulses that are nonzero. In other words, if each pulse of the pulse sequence has a pulse width (duration), and the window of time spans an integer number of pulse time slots, each of which is the duration of a pulse, only a small percentage (e.g., <10%) of the total number of pulse time slots are occupied by pulses.

Figure 9A:
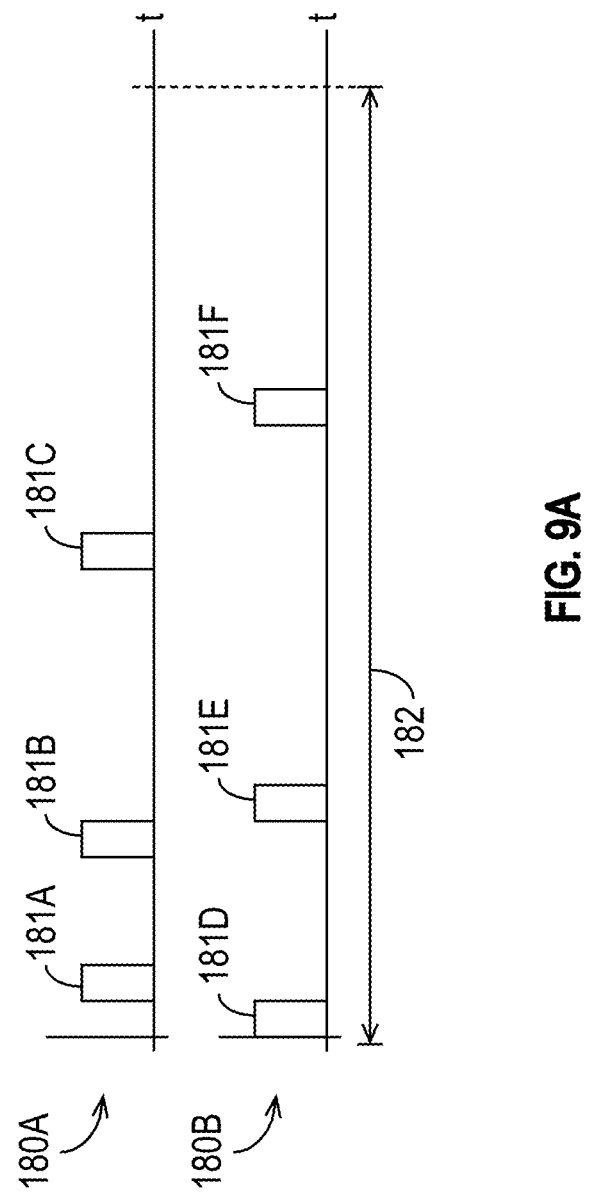
FIG. 9A illustrates two simple pulse sequences to illustrate the design principles of the pulse sequences in accordance with some embodiments.

FIG. 9A illustrates two simple pulse sequences 180A and 180B to illustrate the design principles of the pulse sequences in accordance with some embodiments. Each of the pulse sequences 180A and 180B has three pulses. The pulse sequence 180A has the pulses 181A, 181B, and 181C, and the pulse sequence 180B has the pulses 181D, 181E, and 181F. As shown in FIG. 9A, within the time window 182, none of the pulses 181A, 181B, 181C of the pulse sequence 180A overlaps any of the pulses 181D, 181E, 181F of the pulse sequence 180B.

Figure 9B:
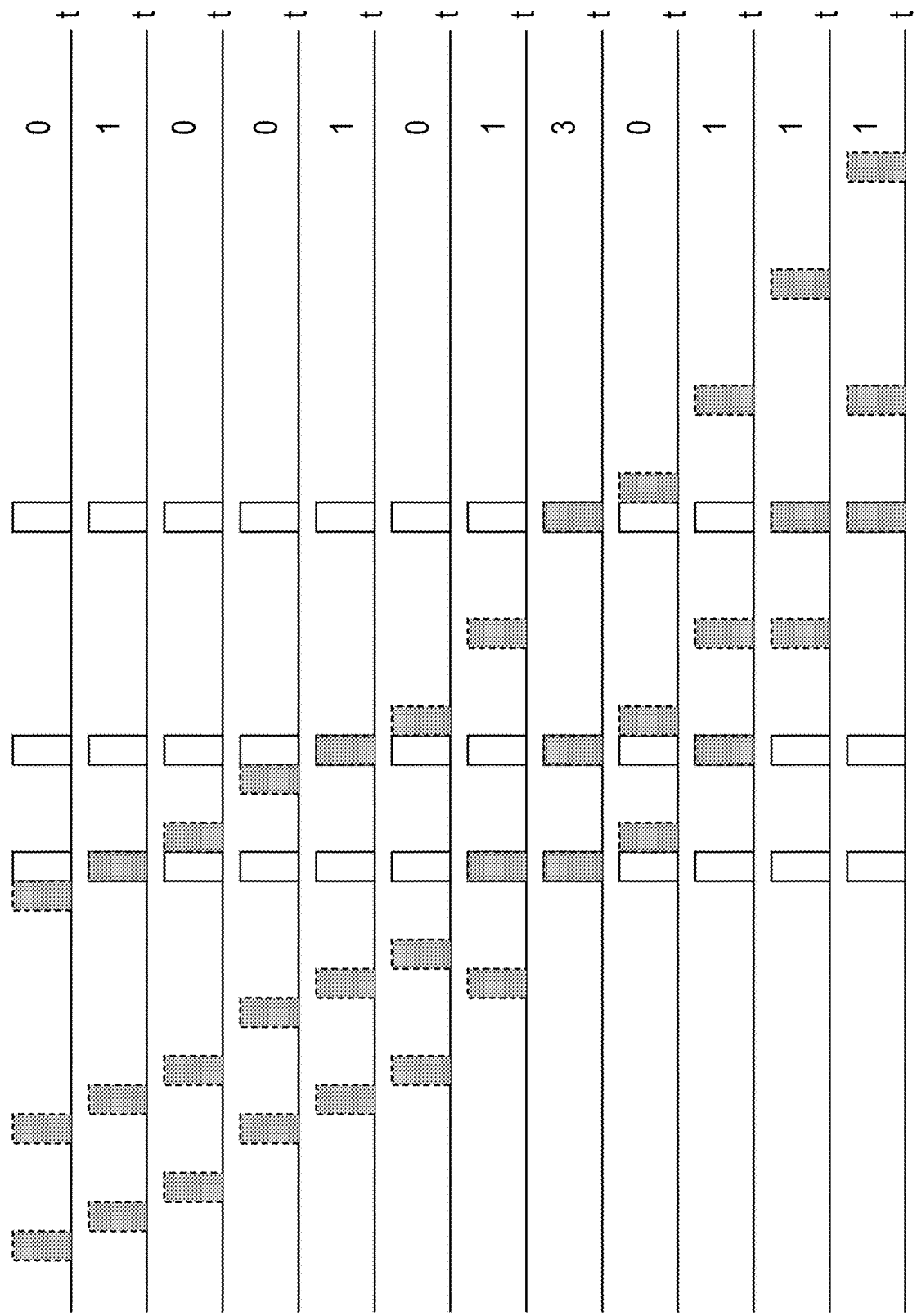
FIG. 9B illustrates the autocorrelation of one of the simple exemplary pulse sequences shown in FIG. 9A in accordance with some embodiments.

Ideally, each pulse sequence 180 has "almost white" autocorrelation, meaning that each pulse sequence 180 has an overlap that is below a threshold. For example, the threshold may be either zero pulses, or at most a small predetermined number of pulses (e.g., 1, 2, or 3, depending on the application), with all shifted versions of itself. FIG. 9B illustrates the autocorrelation of the simple pulse sequence 180A of FIG. 9A at various overlap positions, with the number of overlapping pulses 181 provided on the right-hand side of the figure. Assuming the time window 182 is slotted such that each pulse 181 can fall only within a pulse time slot, the autocorrelation results in a maximum of one pulse of overlap for every correlation of the pulse sequence 180A and every shifted version of itself. The maximum value of the autocorrelation is, of course, 3 because the pulse sequence 180A has three pulses in the time window 182.

Figure 9C:
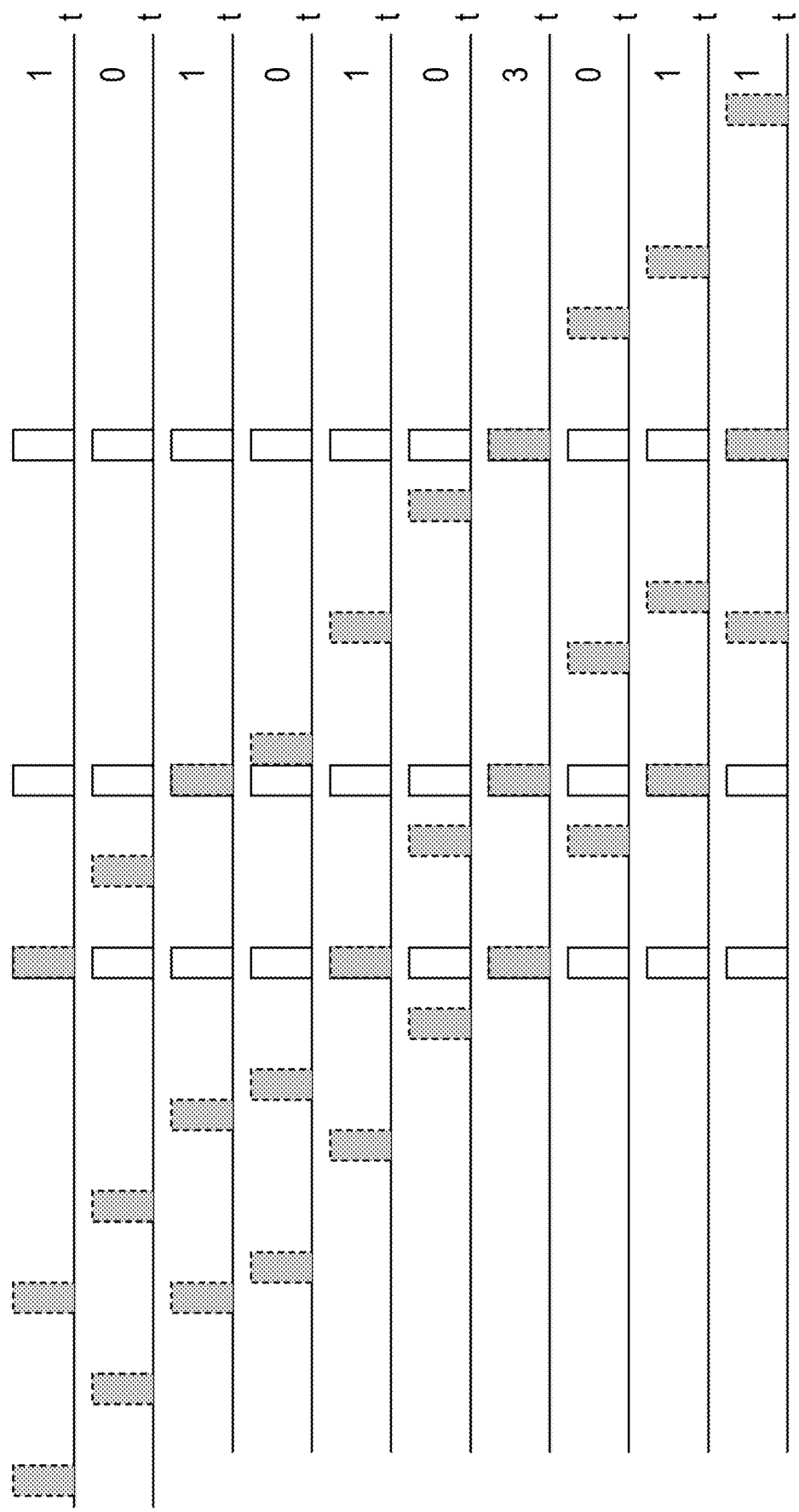
FIG. 9C illustrates the autocorrelation of another one of the simple exemplary pulse sequences shown in FIG. 9A in accordance with some embodiments.

FIG. 9C illustrates the autocorrelation of the simple pulse sequence 180B of FIG. 9A at various overlap positions, with the number of overlapping pulses 181 provided on the right-hand side of the figure. Assuming the time window 182 is slotted such that each pulse 181 can fall only within a pulse time slot, the autocorrelation of the pulse sequence 180B also results in a maximum of one pulse of overlap for every correlation of the pulse sequence 180B and every shifted version of itself. The maximum value of the autocorrelation is, of course, 3 because the pulse sequence 180B has three pulses in the time window 182.

Ideally, the pulse sequences 180 used by different illuminators 120 with overlapping illuminator FOVs 122 are substantially uncorrelated with each other, meaning that each pulse sequence 180 will have, at most, a small predetermined number of pulses (e.g., 1, 2, or 3, depending on the application) with all shifted versions all other pulse sequences 180 used by illuminators 120 with overlapping illuminator FOVs 122. FIG. 9D illustrates the cross-correlation of the simple pulse sequences 180A and 180B of FIG. 9A at various positions, with the number of overlapping pulses 181 provided on the right-hand side of the figure. As shown, the maximum number of pulses that overlap for any shift is 1. Thus, the simple pulse sequences 180A and 180B can be said to be substantially uncorrelated. It is to be appreciated that greater amounts of pulse overlap may also be considered substantially uncorrelated. For example, a maximum amount of overlap below a certain threshold (e.g., a specified percentage of pulses (relative to the total)) may be considered to render the pulse sequences 180 substantially uncorrelated. As a specific example, if two pulse sequences 180 span a time period of 500 pulse widths and the maximum amount of overlap in the cross-correlation is less than 10% (fewer than 50 pulses ever overlap at once), that amount of overlap may be considered to result in the two pulse sequences 180 being substantially uncorrelated. The objective is to select pulse sequences 180 that enable detectors 130 to be able to distinguish between pulse sequences 180 emitted by different illuminators 120 with overlapping FOVs 122.

It is to be understood that although the discussion above describes the use of distinct pulse sequences in the context of illuminators 120 that have overlapping FOVs 122, it is also desirable for illuminators 120 to use distinct pulse sequences when a detector 130 has a detector FOV 132 that intersects multiple illuminator FOVs 122, even if the illuminator FOVs 122 do not themselves overlap. For example, if a detector FOV 132 intersects the illuminator FOV 122A of a first illuminator 120A and the illuminator FOV 122B of a second illuminator 120B, the pulse sequence 180 used by the first illuminator 120A should be different and distinguishable from the pulse sequence used by the second illuminator 120B, even if the first and second illuminator FOVs 122A, 122B do not overlap, so that the detector 130 (or the at least one processor 140) can determine which illuminator 120 emitted the optical signal that resulted in each reflected signal.

Although FIGS. 9A through 9D illustrate simple pulse sequences 180 that use pulses 181 with a single amplitude (i.e., the pulse 181 is either on or off in a time slot), the pulses 181 in a pulse sequence 180 could alternatively have a variety of possible nonzero amplitudes.

Any number of pulse sequences 180 used in the MIMO LiDAR system 100 can be designed to have any lengths, any desired weight (e.g., any number of nonzero pulses 181 per sequence/time window 182), any non-origin maximum value of the autocorrelation function, and any maximum value of the cross-correlation between two distinct pulse sequences 180. The pulse sequences 180 may be designed using, for example, algebraic tools, such as difference sets and generalized difference sets, through constrained randomized techniques, through convex optimization, or through a combination of these techniques and tools. The pulse sequences 180 may also be designed using brute force methods (e.g., exhaustive search).

Figure 10B:
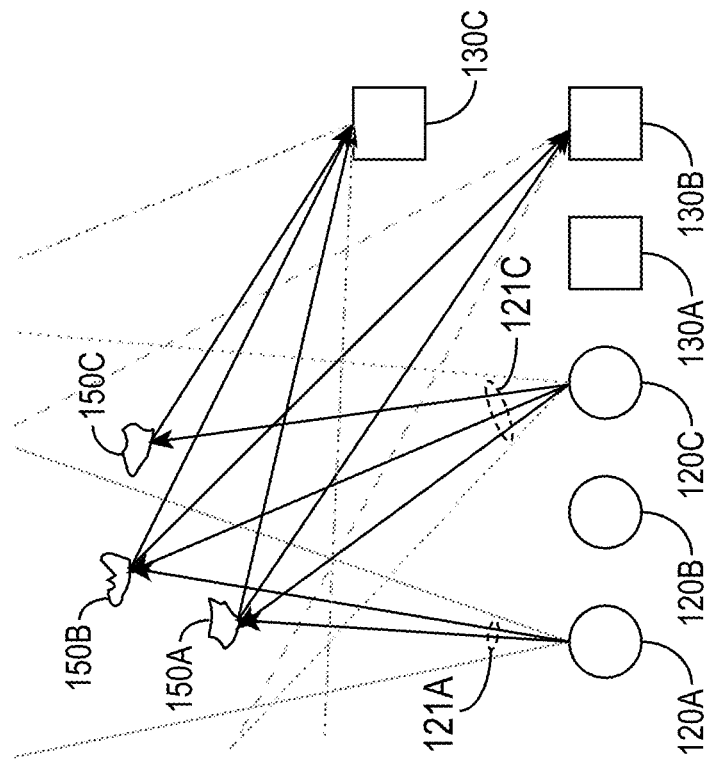
FIGS. 10A, 10B, 10C, 10D, 10E, and 10F illustrate how another exemplary MIMO LiDAR system can use two illuminators and two detectors to determine the positions of objects in a volume of space in accordance with some embodiments.
Figure 10A:
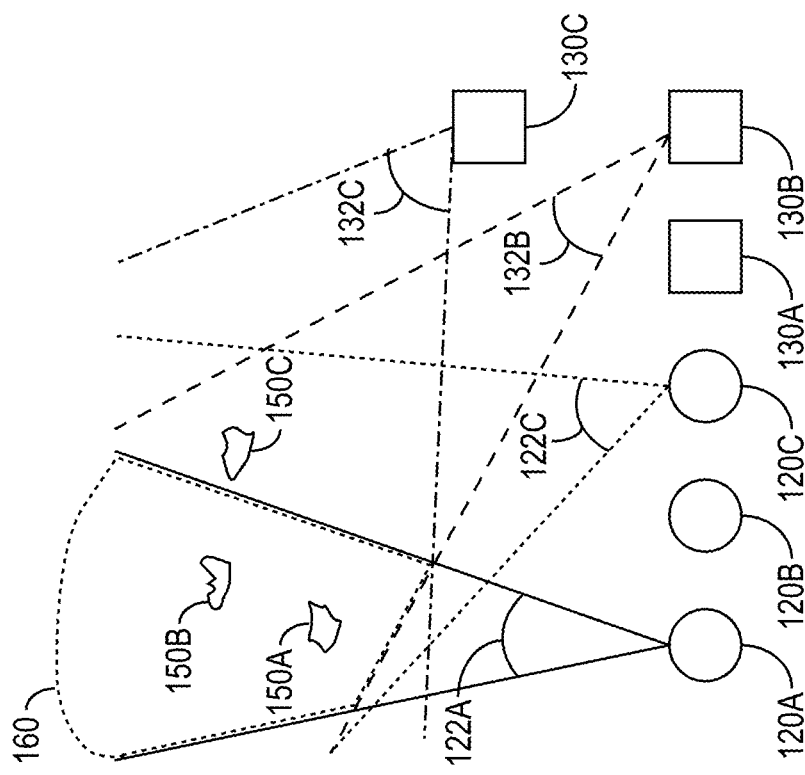

As explained previously, any combination of illuminators 120 and detectors 130 may be used to detect targets in a volume of space 160, as long as the conditions of $n_1 \times n_2 > 2$ and non-collinearity of the set of illuminators 120 and detectors 130 are met. FIGS. 10A, 10B, 10C, 10D, 10E, and 10F illustrate how an exemplary MIMO LiDAR system 100 can use two illuminators 120 and two detectors 130 to determine the positions of targets 150 in a volume of space 160 in accordance with some embodiments. Specifically, as illustrated in FIG. 10A, two illuminators 120A and 120C illuminate a volume of space 160, and two detectors 130B and 130C detect optical signals reflected by targets 150 within the volume of space 160. As previously described, the volume of space 160 is the intersection of the illuminator FOVs 122A and 122C, and the detector FOVs 132B and 132C. The detector FOVs 132B and 132C both intersect at least a portion of each of the illuminator FOVs 122A and 122C. Although FIG. 10A illustrates only two dimensions, it is to be understood that the illuminator FOVs 122A and 122C, the detector FOVs 132B and 132C, and the volume of space 160 are all, in general, three-dimensional.

FIG. 10A shows four exemplary unique illuminator-detector pairs 112. One unique illuminator-detector pair 112 is the illuminator 120A and the detector 130B; a second unique illuminator-detector pair 112 is the illuminator 120A and the detector 130C; a third unique illuminator-detector pair 112 is the illuminator 120C and the detector 130B; and a fourth unique illuminator-detector pair 112 is the illuminator 120C and the detector 130C.

FIG. 10A illustrates three targets, 150A, 150B, and 150C within the range of the MIMO LiDAR system 100. The targets 150A and 150B are within the volume of space 160 defined by the illuminator FOVs 122A and 122C, and the detector FOVs 132B and 132C, and, therefore, the positions of the targets 150A and 150B within the volume of space 160 can be determined as described further below.

As illustrated in FIG. 10A, the target 150C is in a region that is illuminated by the illuminator 120C and detected by the detectors 130B and 130C, but because it is not illuminated by the illuminator 120A, its position cannot be determined using only the set of optical components whose FOVs are shown (namely, illuminators 120A and 120C and detectors 130B and 130C). It is to be understood that if the detector 130A can sense a volume of space that includes the position of the target 150C, then the illuminator 120C and the detectors 130A, 130B, and 130C could be used to determine the coordinates of the target 150C. Likewise, if the illuminator 120B has an illuminator FOV 122B that overlaps the position of the target 150C, the combination of the illuminators 120B and 120C and the detectors 130B and 130C can be used to determine the position of the target 150C. As explained previously, any set of optical components (illuminator(s) 120 and detector(s) 130) meeting the conditions of $n_1 \times n_2 > 2$ and non-collinearity of the set of illuminators 120 and detectors 130 can be used to determine the position of the target 150C (or any other target in the applicable volume of space).

To determine the positions of the targets 150A and 150B, the MIMO LiDAR system 100 determines, for each unique illuminator-detector pair 112, a distance set as described above. FIG. 10B illustrates rays that represent optical signals emitted by the illuminators 120A and 120C, reflected by the targets 150A, 150B, and, in the case of the illuminator 120C, the target 150C, and detected by the detectors 130B and 130C. The illuminator 120A emits an optical signal represented by the rays 121A, which is reflected by both the target 150A and the target 150B, and then detected by the detectors 130B and 130C. Similarly, the illuminator 120C emits an optical signal represented by the rays 121C, which is reflected by each of the targets 150A, 150B, and 150C because the illuminator FOV 122C encompasses the region where the target 150C is situated. The optical signals reflected by the targets 150A and 150B are detected by both of the detectors 130B and 130C, whereas the optical signals reflected by the target 150C are detected only by the detector 130C.

Figure 10D:
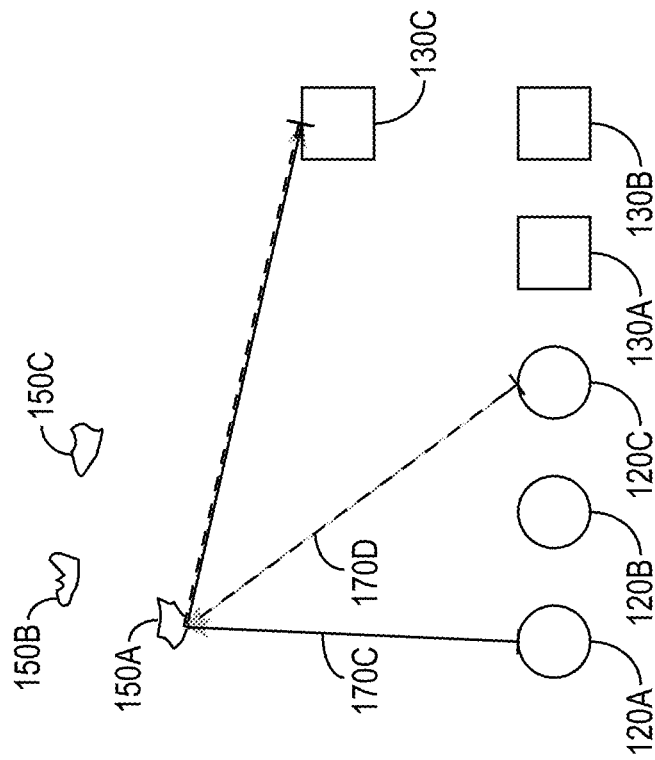
Figure 10C:
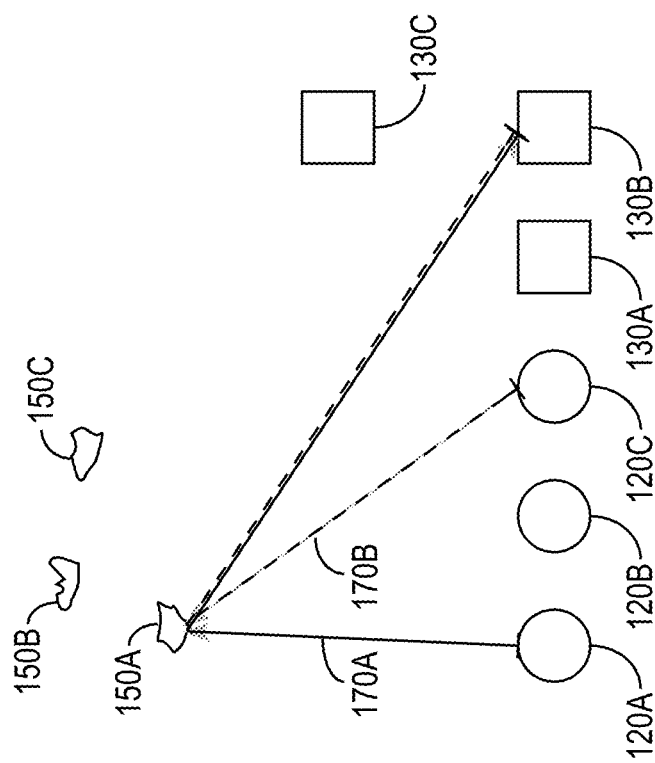

FIG. 10C illustrates the distances traversed by the optical signals between the illuminators 120A and 120C, the target 150A, and the detector 130B. Specifically, the optical signal emitted by the illuminator 120A and reflected by the target 150A traverses a distance 170A (solid lines) before being detected by the detector 130B. The optical signal emitted by the illuminator 120C and reflected by the target 150A traverses a distance 170B (dashed lines) before being detected by the detector 130B.

FIG. 10D illustrates the distances traversed by the optical signals between the illuminators 120A and 120C, the target 150A, and the detector 130C. Specifically, the optical signal emitted by the illuminator 120A and reflected by the target 150A traverses a distance 170C (solid lines) before being detected by the detector 130C, and the optical signal emitted by the illuminator 120C and reflected by the target 150A traverses a distance 170D (dashed lines) before being detected by the detector 130C.

Figure 10F:
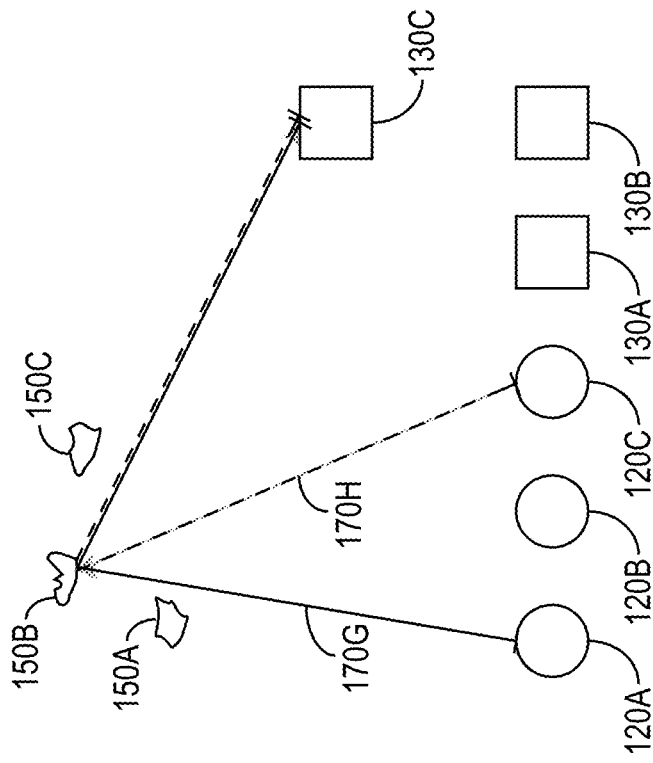
Figure 10E:
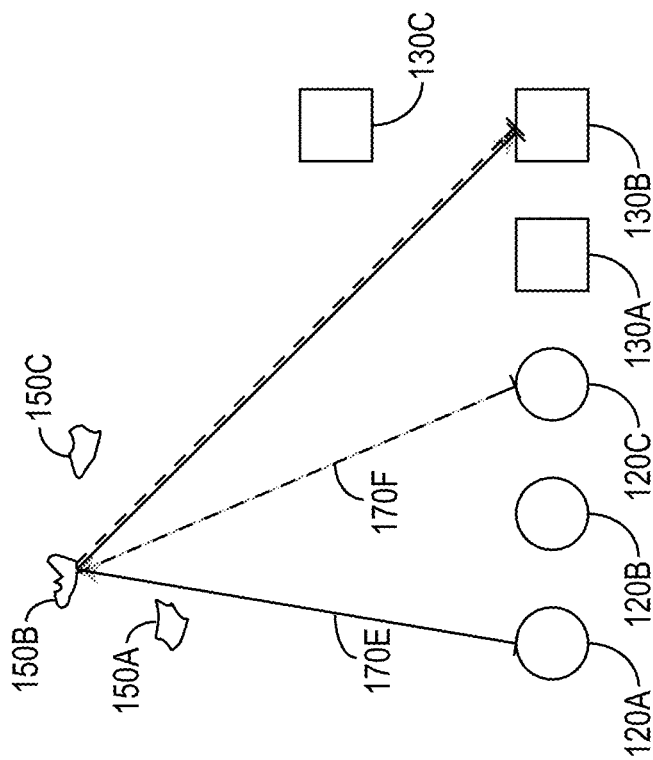

FIG. 10E illustrates the distances traversed by the optical signals between the illuminators 120A and 120C, the target 150B, and the detector 130B. Specifically, the optical signal emitted by the illuminator 120A and reflected by the target 150B traverses a distance 170E (solid lines) before being detected by the detector 130B. The optical signal emitted by the illuminator 120C and reflected by the target 150B traverses a distance 170F (dashed lines) before being detected by the detector 130B.

FIG. 10F illustrates the distances traversed by the optical signals between the illuminators 120A and 120C, the target 150B, and the detector 130C. Specifically, the optical signal emitted by the illuminator 120A and reflected by the target 150B traverses a distance 170G (solid lines) before being detected by the detector 130C, and the optical signal emitted by the illuminator 120C and reflected by the target 150B traverses a distance 170H (dashed lines) before being detected by the detector 130C.

As explained above, the at least one processor 140 of the MIMO LiDAR system 100 can estimate the distances 170A, 170B, 170C, 170D, 170E, 170F, 170G, and 170H from the times of flight. As also explained above, however, if the illuminators 120A and 120C transmit identical optical signals at the same time, the detectors 130B and 130C may be unable to determine which detected optical signal corresponds to which illuminator 120 and to which target 150. In general, if two or more illuminators 120 emit optical signals at the same time and in overlapping illuminator FOVs 122 (or detector FOVs 132), there is the potential for detectors 130 sensing targets 150 in the common region to be confused and/or unable to resolve targets 150. Consequently, in some embodiments, and as described above, each of the illuminators 120A and 120C transmits a respective pulse sequence 180 that allows the detectors 130B and 130C (and/or the at least one processor 140) to distinguish between reflected detected signals that originated from the illuminator 120A and those that originated from the illuminator 120C. As explained above, the pulse sequences 180 used by the illuminators 120A and 120C may have substantially white autocorrelation and may be substantially uncorrelated with each other. The previous discussion of pulse sequences 180 (e.g., in the context of FIGS. 9A through 9D) is applicable here and is not repeated.

Detection and Coordinate Estimation

The following discussion is applicable to any MIMO LiDAR system 100 in which the conditions of (1) $n_1 \times n_2 > 2$ and (2) non-collinearity of the set of illuminators 120 and detectors 130 are satisfied, including those described previously.

Targets 150 in a volume of space 160 can either be determined through (a) direct detection and coordinate estimation or (b) scanning the scene. Both approaches are described below.

For direct detection and coordinate estimation, the MIMO LiDAR system 100 determines the times of flight of detected optical signals. In the following discussion, to reduce the potential for confusion, certain reference numerals are generally omitted in favor of letters that operate as indices. For example, illuminators 120 are referred to and indexed by the letter i, detectors 130 are referred to and indexed by the letter j, and targets 150 are referred to and indexed by the letter k.

Referring again to FIG. 1B, for each of the j detectors of the plurality of detectors in the MIMO LiDAR system 100, the at least one processor 140 implements a receiver algorithm to identify the pulse sequences received in that detector's FOV 132 and their corresponding delays, $t_{ijk}$, where i denotes the illuminator 120 that emitted the detected optical signal, k denotes the kth delay (associated with the kth target), and each $t_{ijk}$ corresponds to a particular target 150. (It is to be understood that the "particular target" is not necessarily the same for each $t_{ijk}$. In other words, a set of multiple $t_{ijk}$ values can correspond to one or more targets in the detector j's detector FOV 132.)

There are a number of ways the at least one processor 140 can identify the pulse sequences that are present in a detected optical signal and their corresponding delays. For example, the at least one processor 140 can perform respective correlations of each possible emitted pulse sequence and the detected reflected signals, and then identify peaks in the correlation result to determine which of the possible emitted pulse sequences are present and estimate the delays corresponding to the targets. The correlation may be performed, for example, in the time domain or by performing an equivalent procedure in the frequency domain.

As another example, because the pulse sequences 180 described herein are sparse, the at least one processor 140 can use optimization procedures explicitly exploit the structures of the pulse sequences, to "denoise" a received optical signal. For example, the at least one processor 140 can denoise a received optical signal by using atomic norm minimization (e.g., by minimizing an atomic norm of the denoised received signal subject to a constraint on a metric characterizing the closeness of the denoised received signal to the emitted pulse sequence (e.g., squared Euclidean distance, $L^1$ norm, $L^\infty$ norm, etc.)). As used herein, the term "denoised signal" refers to a signal, which may be analog or digital, that has been subjected to an optimization procedure, the result of which is an extracted signal, which may be analog or digital, that has less noise than the original signal. As used herein, the term "optimization procedure" refers to any (possibly nonlinear) signal processing technique that explicitly exploits the structure of one or more signals being processed to select a best estimate (with regard to some criterion) from some set of (possibly uncountable) alternatives (e.g., the possible emitted pulse sequences). An optimization procedure may be iterative.

In the atomic norm framework used in accordance with some embodiments, we assume that we have a set of atoms $$\mathcal{A} = \{\eta_i\},$$

where the set may be finite, countably infinite, or even uncountably infinite. We will call a signal x structured if it can be written as the sum of a few atoms, say K of them, where K is less than the dimension of the ambient space of x, i.e., $$x = \sum_{k=1}^{K} \alpha_k \eta_k.$$

In the above, the $\alpha_k$ are (possibly complex) scalars.

The atomic norm of a vector x, with respect to a set of atoms $\mathcal{A} = \{\eta_i\}$ is defined as $$\|x\|_{\mathcal{A}} = \min_{\text{subject to } x = \sum_k c_k \eta_k} \|c\|_1$$

In other words, the atomic norm of x is the most economical way that x can be expressed in terms of a linear combination of atoms, where by economical we mean the representation that minimizes the $\|\cdot\|$ norm, where $\|c\| = \Sigma_k |c_k|$. A small atomic norm means that x can be represented as the sum of a few atoms. Conversely, a large atomic norm means that many atoms are needed to represent x.

Under the assumption that the pulse sequences 180 used by the MIMO LiDAR system 100 are sparse, to identify the pulse sequences and their respective delays, the at least one processor 140 can use an atomic norm denoiser (tuned to the corresponding pulse sequence) followed by a correlation receiver.

As another example, the at least one processor 140 can use an atomic norm denoiser followed by any sinusoid-in-noise estimator, such as MUSIC, ESPRIT, Hankel norm approximation, Prony, Burg, or others. As yet another example, the at least one processor 140 can use an atomic norm denoiser involving a search over a finite set of atoms.

Each $t_{ijk}$ can be used to determine the time of flight of the optical signal emitted by illuminator i and received by detector j when reflected off target k. In other words, the distance 170 from illuminator i to detector j via target k is simply $ct_{ikj}$, where c is the speed of light. The distance $ct_{ikj}$ yields an ellipsoid, whose focal points are the coordinates of illuminator i and detector j, such that target k must reside on this ellipsoid (because the sum of its distances from the focal points is $ct_{ikj}$).

For the case of $n_1=1$ and $n_2=3$ (i.e., one illuminator 120 and three detectors 130), each point in a volume of space 160 is observed by at least three detectors 130. Thus, every target k in that volume of space 160 is illuminated by (at least) an illuminator i and observed by (at least) three detectors $j_1, j_2,$ and $j_3$ (where the collection of the illuminator and the detectors is arranged non-collinearly). The exact coordinates of the kth target can be determined from $ct_{ij_1k}$, $ct_{ij_2k}$, and $ct_{ij_3k}$ by solving a system of quadratic equations that intersects the three ellipsoids, as described further below.

Similarly, for the case of $n_1=2$ and $n_2=2$ (i.e., two illuminators 120 and two detectors 130), every target k in the volume of space 160 is illuminated by (at least) two illuminators $i_1$ and $i_2$ and observed by (at least) two detectors $j_1$ and $j_2$ (where the collection of illuminators and detectors is arranged non-collinearly). The exact coordinates of the kth target can be determined from $ct_{i_1j_1k}$, $ct_{i_2j_1k}$, $ct_{i_1j_2k}$, and $ct_{i_2j_2k}$ by solving a system of quadratic equations that intersects the four ellipsoids, as described further below.

Likewise, for the case of $n_1=3$ and $n_2=1$ (i.e., three illuminators 120 and one detector 130), each point in a volume of space 160 is illuminated by at least three illuminators 120. Thus, every target k in that volume of space 160 is illuminated by (at least) three illuminators $i_1, i_2,$ and $i_3 j$ and observed by (at least) one detector j (where the collection of the illuminator and the detectors is arranged non-collinearly). The exact coordinates of the kth target can be determined from $ct_{i_1jk}$, $ct_{i_2jk}$, and $ct_{i_3jk}$ by solving a system of quadratic equations that intersects the three ellipsoids, as described further below. It is to be appreciated that there are myriad ways to solve a system of quadratic equations, and the specific approach described herein is merely one example of a suitable technique. Those having ordinary skill in the art will be able to identify and apply other solutions without undue experimentation.

Distances for other combinations of $n_1$ and $n_2$ meeting the condition of $n_1 \times n_2 > 2$ can be derived similarly.

The equation for each of the ellipsoids can be determined as follows. Assuming that an illuminator i is at coordinates $(x_i, y_i, z_i)$, a target k is at the coordinates $(x_k, y_k, z_k)$, and a detector j is at coordinates $(x_j, y_j, z_j)$, for a round-trip time of t, the target k lies on the ellipse given by $$\sqrt{(x-x_i)^2+(y-y_i)^2+(z-z_i)^2}+\sqrt{(x-x_j)^2+(y-y_j)^2+(z-z_j)^2}=ct$$

Assume there are $n_1$ illuminators 120 at coordinates $(x_{i_p}, y_{i_p}, z_{i_p})$ for $p=1, \ldots, n_1$ for illuminating an unknown target at coordinates $(x, y, z)$ and $n_2$ detectors 130 at coordinates $(x_{i_q}, y_{i_q}, z_{i_q})$ for $q=1, \ldots, n_2$ for detecting the unknown target at coordinates $(x, y, z)$. Assume that the round-trip time between illuminator i and detector j (reflecting off of the unknown target) is $t_{ij}$. Then the coordinates of the unknown target can be obtained by solving the following optimization problem:

$$\min_{x,y,z} \sum_{p=1}^{n_1} \sum_{q=1}^{n_2} \left[ \sqrt{(x-x_{i_p})^2 + (y-y_{i_p})^2 + (z-z_{i_p})^2} + \sqrt{(x-x_{j_q})^2 + (y-y_{j_q})^2 + (z-z_{j_q})^2} - ct_{i_p j_q} \right]^2$$

It is to be appreciated that there are many ways to solve the above optimization problem and thereby determine the unknown coordinates x,y,z of the target. These include first order methods, such as gradient descent, mirror descent, conjugate gradient, etc., as well as second order methods such as Newton's method. There are also Riemannian optimization counterparts of these first and second order methods.

In addition, the solution described above for finding the position in three-dimensional space of the unknown target has been described in a Cartesian coordinate system. As previously stated, and as will be appreciated by those having ordinary skill in the art, the positions of the unknown targets can also be described in a cylindrical coordinate system, a spherical coordinate system, or any other appropriate coordinate system. When using cylindrical or spherical coordinates, rather than a system of quadratic equations, one obtains a system of algebraic-trigonometric equations. These can also be solved in a variety of ways. For example, first and second order Riemannian optimization methods that respect the trigonometric structure may be used.

In the case of $n_1=1$ and $n_2=3$ (i.e., one illuminator 120 and three detectors 130), the algorithm checks for pulse sequences 180 that have arrived from an illuminator i with an illuminator FOV 122 that illuminates the volume of space 160 sensed by the three detectors 130. For every such triple, $ct_{ij_1k}$, $ct_{ij_2k}$, and $ct_{ij_3k}$, the algorithm attempts to solve the system of quadratic equations arising from the three corresponding ellipsoids. If the system of quadratic equations has no real solution, there does not exist a target for this triple. Otherwise, the solution of the system of equations determines the coordinates of the target and confirms its existence.

It is also possible to find targets by scanning a scene. For points of interest (x, y, z) that are to be scanned, the round-trip times of the set(s) of non-collinear illuminators 120 and detectors 130 (where $n_1 \times n_2 \geq 2$) that, respectively, illuminate and observe that point are precomputed and stored (e.g., in a database, computer-readable memory, server, etc.). When the MIMO LiDAR system 100 is in operation, the delays (distances) detected by the detector(s) 130 are checked to determine whether they correspond to any of the pre-computed round-trip times (or distances). If so, then the position of the target is known.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As an example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A light detection and ranging (LiDAR) system, comprising:
    an array of optical components, the array comprising a plurality of illuminators and a plurality of detectors, each of the plurality of illuminators having a respective illuminator field of view (FOV), and each of the plurality of detectors having a respective detector FOV; and
    at least one processor coupled to the array of optical components and configured to execute at least one machine-executable instruction that, when executed, causes the at least one processor to:
        determine a first distance set, wherein the first distance set corresponds to a first unique illuminator-detector pair in the array of optical components, and wherein the first distance set includes, for each target of a plurality of targets in a volume of space, a respective estimated distance traversed by an optical signal emitted by an illuminator of the first unique illuminator-detector pair, reflected by the target, and detected by a detector of the first unique illuminator-detector pair,
        determine a second distance set, wherein the second distance set corresponds to a second unique illuminator-detector pair in the array of optical components, and wherein the second distance set includes, for each target of the plurality of targets in the volume of space, a respective estimated distance traversed by an optical signal emitted by an illuminator of the second unique illuminator-detector pair, reflected by the target, and detected by a detector of the second unique illuminator-detector pair,
        determine a third distance set, wherein the third distance set corresponds to a third unique illuminator-detector pair in the array of optical components, and wherein the third distance set includes, for each target of the plurality of targets in the volume of space, a respective estimated distance traversed by an optical signal emitted by an illuminator of the third unique illuminator-detector pair, reflected by the target, and detected by a detector of the third unique illuminator-detector pair, and based at least in part on the first, second, and third distance sets, estimate a respective position, in three-dimensional space, of each target of the plurality of targets, wherein:
at least two of the illuminator of the first unique illuminator-detector pair, the detector of the first unique illuminator-detector pair, the illuminator of the second unique illuminator-detector pair, the detector of the second unique illuminator-detector pair, the illuminator of the third unique illuminator-detector pair, or the detector of the third unique illuminator-detector pair are non-collinear, the volume of space is within each of (a) a FOV of the illuminator of the first unique illuminator-detector pair, (b) a FOV of the detector of the first unique illuminator-detector pair, (c) a FOV of the illuminator of the second unique illuminator-detector pair, (d) a FOV of the detector of the second unique illuminator-detector pair, (e) a FOV of the illuminator of the third unique illuminator-detector pair, and (f) a FOV of the detector of the third unique illuminator-detector pair, and the at least one machine-executable instruction causes the at least one processor to determine the first distance set in part by:
performing a correlation, and
identifying at least one peak in a result of the correlation.

2. The LiDAR system recited in claim 1, wherein the at least one machine-executable instruction causes the at least one processor to estimate the respective position of each of the plurality of targets by solving at least one quadratic equation.

3. The LiDAR system recited in claim 1, wherein the at least one machine-executable instruction further causes the at least one processor to determine the first distance set in part by:
denoising the optical signal detected by the detector of the first unique illuminator-detector pair,
and wherein the correlation is a correlation of the denoised detected optical signal and the optical signal emitted by the illuminator of the first unique illuminator-detector pair.

4. The LiDAR system recited in claim 3, wherein denoising the optical signal detected by the detector of the first unique illuminator-detector pair comprises determining or minimizing an atomic norm.

5. The LiDAR system recited in claim 1, wherein the optical signal emitted by the illuminator of the first unique illuminator-detector pair comprises a first pulse sequence transmitted during a time window.

6. The LiDAR system recited in claim 5, wherein the first pulse sequence is sparse.

7. The LiDAR system recited in claim 5, wherein the first pulse sequence is substantially white.

8. The LiDAR system recited in claim 5, wherein the optical signal emitted by the illuminator of the second unique illuminator-detector pair comprises a second pulse sequence transmitted during the time window, wherein the second pulse sequence is different from the first pulse sequence.

9. The LiDAR system recited in claim 8, wherein the first pulse sequence and the second pulse sequence are substantially uncorrelated.

10. The LiDAR system recited in claim 8, wherein the first and second pulse sequences are sparse.

11. The LiDAR system recited in claim 8, wherein of each of the first and second pulse sequences is substantially white.

12. The LiDAR system recited in claim 8, wherein a maximum value of a cross-correlation of the first pulse sequence and the second pulse sequence is less than a threshold.

13. The LiDAR system recited in claim 12, wherein the threshold is a maximum number of overlapping pulses.

14. The LiDAR system recited in claim 8, wherein the optical signal emitted by the illuminator of the third unique illuminator-detector pair comprises a third pulse sequence transmitted during the time window, wherein the third pulse sequence is different from the first pulse sequence and different from the second pulse sequence.

15. The LiDAR system recited in claim 14, wherein:
the first pulse sequence and the second pulse sequence are substantially uncorrelated,
the first pulse sequence and the third pulse sequence are substantially uncorrelated, and
the second pulse sequence and the third pulse sequence are substantially uncorrelated.

16. The LiDAR system recited in claim 14, wherein the first, second, and third pulse sequences are sparse.

17. The LiDAR system recited in claim 14, wherein each of the first, second, and third pulse sequences is substantially white.

18. The LiDAR system recited in claim 1, wherein at least two of the illuminator of the first unique illuminator-detector pair, the illuminator of the second unique illuminator-detector pair, or the illuminator of the third unique illuminator-detector pair are a same illuminator.

19. The LiDAR system recited in claim 1, wherein at least two of the detector of the first unique illuminator-detector pair, the detector of the second unique illuminator-detector pair, or the detector of the third unique illuminator-detector pair are a same detector.

20. The LiDAR system recited in claim 1, wherein:
at least two of the illuminator of the first unique illuminator-detector pair, the illuminator of the second unique illuminator-detector pair, or the illuminator of the third unique illuminator-detector pair are a same illuminator, and
at least two of the detector of the first unique illuminator-detector pair, the detector of the second unique illuminator-detector pair, or the detector of the third unique illuminator-detector pair are a same detector.

21. The LiDAR system recited in claim 1, wherein, when executed, the at least one machine-executable instruction causes the at least one processor to estimate the respective position, in three-dimensional space, of each target of the plurality of targets by solving at least one optimization problem.

22. The LiDAR system recited in claim 21, wherein the at least one optimization problem comprises $$\min_{x,y,z} \sum_{p=1}^{n_1} \sum_{q=1}^{n_2} \left[ \sqrt{(x-x_{i_p})^2 + (y-y_{i_p})^2 + (z-z_{i_p})^2} + \sqrt{(x-x_{j_q})^2 + (y-y_{j_q})^2 + (z-z_{j_q})^2} - ct_{i_p,j_q} \right]^2.$$

23. The LiDAR system recited in claim 1, wherein, when executed, the at least one machine-executable instruction causes the at least one processor to estimate the respective position, in three-dimensional space, of each target of the plurality of targets by determining whether at least one estimated distance in the first, second, or third distance set corresponds to a stored, pre-computed distance.

\* \* \* \* \*